(12) United States Patent
Kim et al.

(10) Patent No.: US 9,966,799 B2
(45) Date of Patent: May 8, 2018

(54) APPARATUS FOR AND METHOD OF PROTECTING WIRELESS-COUPLED POWER DEVICES FROM OVERVOLTAGE, OVERCURRENT, AND OVERTEMPERATURE USING HYSTERESIS

(71) Applicant: Samsung Electronics Co., Ltd, Suwon-si (KR)

(72) Inventors: Dong Zo Kim, Yongin-si (KR); Sang Wook Kwon, Seongnam-si (KR); Yun Kwon Park, Dongducheon-si (KR); Eun Seok Park, Yongin-si (KR); Young Tack Hong, Seongnam-si (KR); Ki Young Kim, Yongin-si (KR); Young Ho Ryu, Yongin-si (KR); Nam Yun Kim, Seoul (KR); Jin Sung Choi, Gimpo-si (KR); Chang Wook Yoon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 319 days.

(21) Appl. No.: 14/796,102

(22) Filed: Jul. 10, 2015

(65) Prior Publication Data
US 2015/0318713 A1    Nov. 5, 2015

Related U.S. Application Data

(63) Continuation of application No. 13/473,821, filed on May 17, 2012, now Pat. No. 9,083,178.

(30) Foreign Application Priority Data

May 17, 2011   (KR) .................. 10-2011-0046277
May 24, 2011   (KR) .................. 10-2011-0049244

(51) Int. Cl.
*H02J 5/00*        (2016.01)
*H02J 17/00*       (2006.01)
(Continued)

(52) U.S. Cl.
CPC .............. *H02J 50/12* (2016.02); *H02H 3/08* (2013.01); *H02H 3/20* (2013.01); *H02H 5/042* (2013.01);
(Continued)

(58) Field of Classification Search
CPC .. H02H 3/08; H02H 3/20; H02H 5/042; H02J 5/005; H02J 7/025; H02J 17/00
(Continued)

(56) References Cited

U.S. PATENT DOCUMENTS 3,753,001 A    8/1973   Hiroshima et al.
3,814,987 A    6/1974   Chacon
(Continued)

FOREIGN PATENT DOCUMENTS

JP    2006-115592 A    4/2006
JP    2006-165860 A    6/2006
(Continued)

OTHER PUBLICATIONS

Korean Office Action dated Sep. 28, 2017 in counterpart Korean Patent Application No. 10-2011-0049244 (4 pages in English, 3 pages in Korean).

*Primary Examiner* — Thienvu Tran
*Assistant Examiner* — Kevin J Comber
(74) *Attorney, Agent, or Firm* — NSIP Law

(57) ABSTRACT

An overvoltage protecting unit and an overcurrent protecting unit protect a power device from an overvoltage and an overcurrent using a comparator having hysteresis. An overtemperature protecting unit protects the power device from
(Continued)

an overtemperature using a thermistor having a resistance that changes as a temperature of the thermistor changes.

14 Claims, 18 Drawing Sheets

(51) Int. Cl.
| | | |
|---|---|---|
| H02J 7/02 | (2016.01) | |
| H02J 50/12 | (2016.01) | |
| H02J 50/80 | (2016.01) | |
| H02J 50/70 | (2016.01) | |
| H02J 50/90 | (2016.01) | |
| H02H 3/08 | (2006.01) | |
| H02H 3/20 | (2006.01) | |
| H02H 5/04 | (2006.01) | |

(52) U.S. Cl.
CPC .............. *H02J 5/005* (2013.01); *H02J 7/025* (2013.01); *H02J 17/00* (2013.01); *H02J 50/70* (2016.02); *H02J 50/80* (2016.02); *H02J 50/90* (2016.02)

(58) Field of Classification Search
USPC ........................................................ 361/780
See application file for complete search history.

(56) References Cited

U.S. PATENT DOCUMENTS

| | | | |
|---|---|---|---|
| 4,196,463 | A | 4/1980 | Pohl |
| 4,310,606 | A | 1/1982 | Maida |
| 4,804,901 | A | 2/1989 | Pertessis et al. |
| 5,031,884 | A | 7/1991 | Baudrit et al. |
| 6,057,999 | A | 5/2000 | Park et al. |
| 7,719,134 | B2 | 5/2010 | Hashimoto et al. |
| 7,791,399 | B2 | 9/2010 | Zhou et al. |
| 2008/0079392 | A1* | 4/2008 | Baarman ............... H02J 7/0072 320/108 |
| 2008/0136342 | A1* | 6/2008 | Tamegai ........... H02M 3/33507 315/209 R |
| 2008/0186094 | A1* | 8/2008 | Lee .......................... H03F 1/301 330/131 |
| 2009/0052096 | A1* | 2/2009 | Takahashi ............... H02M 1/08 361/18 |
| 2010/0091420 | A1* | 4/2010 | Tsai ..................... H02H 7/1213 361/90 |
| 2012/0075760 | A1 | 3/2012 | Robert |
| 2012/0153903 | A1 | 6/2012 | Kim et al. |
| 2012/0194957 | A1 | 8/2012 | Wei et al. |

FOREIGN PATENT DOCUMENTS

| | | |
|---|---|---|
| JP | 2010-28898 A | 2/2010 |
| JP | 2010-166659 A | 7/2010 |
| KR | 10-2008-00050020 A | 1/2008 |
| KR | 10-2010-000586 A | 1/2010 |
| KR | 10-2010-0100736 A | 9/2010 |

\* cited by examiner

APPARATUS FOR AND METHOD OF PROTECTING WIRELESS-COUPLED POWER DEVICES FROM OVERVOLTAGE, OVERCURRENT, AND OVERTEMPERATURE USING HYSTERESIS

CROSS-REFERENCE TO RELATED APPLICATIONS

This application is a Continuation application of U.S. application Ser. No. 13/473,821, filed May 17, 2012, which claims the benefit under 35 USC 119(a) of Korean Patent Application No. 10-2011-0046277 filed on May 17, 2011, in the Korean Intellectual Property Office and Korean Patent Application No. 10-2011-0049244 filed on May 24, 2011, in the Korean Intellectual Property Office, the entire disclosures of which are incorporated herein by reference for all purposes.

BACKGROUND

1. Field

The following description relates to an apparatus for and a method of wireless power transmission, and more specifically to an apparatus and a method that protect wireless-coupled power devices from an overvoltage, an overcurrent, and an overtemperature using hysteresis.

2. Description of Related Art

Wireless power is energy transferred from a wireless power transmitter to a wireless power receiver via magnetic coupling.

Wireless power transmission is a technology for operating a device irrespective of a position of the device by wirelessly transferring a power to the device without a wire.

A wireless power receiver may charge a battery using energy received wirelessly. A wireless power transmission and charging system includes a source device and a target device. The source device wirelessly transmits power. The target device wirelessly receives power. The source device may be referred to as a wireless power transmitter, and the target device may be referred to as a wireless power receiver.

The source device includes a source resonator, and the target device includes a target resonator. Magnetic coupling or resonance coupling is established between the source resonator and the target resonator. The source device and the target device may communicate with each other. During communication, transmission or reception of control information and state information may occur.

Due to a rapid increase in various electronic devices such as electric vehicles, mobile devices, and other devices that may move or be moved from place to place, research on wireless power transmission has been conducted to overcome problems such as an increase in an inconvenience of a wired power supply, or a limit of an existing battery capacity. One wireless power transmission technology uses resonance characteristics of radio frequency (RF) elements. For example, a wireless power transmission system using resonance characteristics includes a source device configured to supply power, and a target device configured to receive supplied power. To efficiently transmit power from the source device to the target device, the source device and the target device need to exchange information about a state of the source device and information about a state of the target device with each other. In other words, there is a need to perform communication between the source device and the target device.

SUMMARY

According to an aspect, an overvoltage protector includes a first resistive divider configured to divide an input voltage to produce a first divided voltage; a rectifier configured to rectify the first divided voltage to produce a rectified voltage; a second resistive divider configured to divide the rectified voltage to produce a second divided voltage; and a comparator configured to receive the second divided voltage as an input through a positive (+) terminal of the comparator; receive a direct current (DC) voltage as an input through a negative (−) terminal of the comparator; output a control signal; change the control signal output by the comparator to a first control signal when a difference between the second divided voltage input through the + terminal and the DC voltage input through the − terminal is greater than or equal to an ON level; and change the control signal output by the comparator to a second control signal when the difference between the second divided voltage input through the + terminal and the DC voltage input through the − terminal is less than or equal to an OFF level.

The first resistive divider may include a first resistor connected to an input of the first resistive divider that receives the input voltage, and an input of the rectifier; and a second resistor connected to the first resistor at the connection to the input of the rectifier, and a ground; and the second resistive divider may include a third resistor connected to an output of the rectifier, and the + terminal of the comparator; and a fourth resistor connected to the third resistor at the connection to the + terminal of the comparator, and the ground.

The rectifier may include a diode including an anode connected to the first resistive divider; and a cathode connected to the second resistive divider; and a capacitor connected to the cathode and a ground.

The first resistive divider may be connected to a drain or a collector of a power device protected by the overvoltage protector.

The overvoltage protector may further include a control unit configured to block a signal from being input to the power device when the control signal output by the comparator is the first control signal.

The OFF level may be less than the ON level to provide the comparator with a hysteresis characteristic.

According to an aspect, an overcurrent protector includes a resistive divider configured to divide a first input voltage to produce a divided voltage; an amplifier configured to amplify the divided voltage to produce an amplified voltage; a switch configured to connect and disconnect the resistive divider and the amplifier from each other in response to a switch control signal; a first comparator configured to receive a second input voltage as an input through a positive (+) terminal of the first comparator; receive a first direct current (DC) voltage as an input through a negative (−) terminal; output the switch control signal; change the switch control signal output by the first comparator to a signal to turn the switch ON when a difference between the second input voltage input through the + terminal and the first DC voltage input through the − terminal is greater than or equal to a first ON level; and change the switch control signal output by the first comparator to a signal to turn the switch OFF when the difference between the second input voltage input through the + terminal and the first DC voltage input through the − terminal is less than or equal to a first OFF level; and a second comparator configured to receive the amplified voltage as an input through a positive (+) terminal of the second comparator; receive a second DC voltage as an input through a negative (−) terminal of the second comparator; output a control signal; change the control signal output by the second comparator to a first control signal when a difference between the amplified voltage input through the + terminal and the second DC voltage input through the − terminal is greater than or equal to a second ON level; and change the control signal output by the second comparator to a second control signal when the difference between the amplified voltage input through the + terminal and the second DC voltage input through the − terminal is less than or equal to a second OFF level.

The resistive divider may include a first resistor connected to an input of the switch, and a ground; and a second resistor connected to an input of the first resistive divider that receives the first input voltage, and the first resistor at the connection to the input of the switch.

The resistive divider may be connected to a drain or a collector of a power device protected by the overcurrent protector.

The overcurrent protector may further include a control unit configured to block a signal from being input to the power device when the control signal is the first control signal.

The first OFF level may be less than the first ON level to provide the first comparator with a hysteresis characteristic; and the second OFF level may be less than the second ON level to provide the second comparator with a hysteresis characteristic.

According to an aspect, an overtemperature protector includes a regulator including an input voltage ($V_{in}$) input, a reference voltage ($V_{ref}$) input, and an output; a first inductor connected to a drain or a collector of a power device protected by the overtemperature protector, and the $V_{in}$ input of the regulator; a thermistor connected to a ground, and the $V_{ref}$ input of the regulator, the thermistor having a resistance that decreases when a temperature of the thermistor increases; and a second inductor connected to the output of the regulator, and a gate or a base of the power device.

The regulator may be a low-dropout (LDO) regulator.

The regulator may be a switching-mode regulator.

According to an aspect, an overvoltage protection method includes dividing an input voltage to produce a first divided voltage; rectifying the first divided voltage to produce a rectified voltage; dividing the rectified voltage to produce a second divided voltage; comparing the second divided voltage with a direct current (DC) voltage; outputting a control signal based on a result of the comparing; changing the control signal to a first control signal when a difference between the second divided voltage and the DC voltage is greater than or equal to an ON level; and changing the control signal to a second control signal when the difference between the second divided voltage and the DC voltage is less than or equal to an OFF level.

The input voltage may be a voltage of a drain or a collector of a power device protected by the overvoltage protection method; and the overvoltage protection method may further include blocking a signal from being input to the power device when the control signal is the first control signal; and allowing the signal to be input to the power device when the control signal is the second control signal.

According to an aspect, an overcurrent protection method includes dividing a first input voltage to produce a divided voltage; comparing a second input voltage with a first direct current (DC) voltage; outputting a switch control signal based on a result of the comparing the second input voltage with the first DC voltage; changing the switch control signal to a signal to turn a switch ON when a difference between the second input voltage and the first DC voltage is greater than or equal to a first ON level; changing the switch control signal to a signal to turn the switch OFF when the difference between the second input voltage and the first DC voltage is less than or equal to a first OFF level; turning the switch ON and OFF to supply and not supply the divided voltage to an amplifier in response to the switch control signal so that the amplifier amplifies the divided voltage and outputs an amplified voltage when the switch is turned ON; comparing the amplified voltage with a second DC voltage; outputting a control signal based on a result of the comparing the amplified voltage with the second DC voltage; changing the control signal to a first control signal when a difference between the amplified voltage is greater than or equal to a second ON level; and changing the control signal to a second control signal when the difference between the amplified voltage the second DC voltage is less than or equal to a second OFF level.

The input voltage may be a voltage of a drain or a collector of a power device protected by the overcurrent protection method; and the overcurrent protection method may further include blocking a signal from being input to the power device when the control signal is the first control signal; and allowing the signal to be input to the power device when the control signal is the second control signal.

According to an aspect, an overtemperature protection method includes applying a voltage of a drain or a collector of a power device protected by the overtemperature method to an input voltage (Vin) input of a regulator; applying a voltage determined by a resistance of a thermistor to a reference voltage (Vref) input of the regulator, the resistance of the thermistor changing as a temperature of thermistor changes; and applying an output voltage of the regulator to a gate or a base of the power device, the output voltage of the regulator depending on Vin and Vref of the regulator.

The regulator may a low-dropout (LDO) regulator or a switching-mode regulator.

Other features and aspects will be apparent from the following detailed description, the drawings, and the claims.

DETAILED DESCRIPTION

Figure 1:
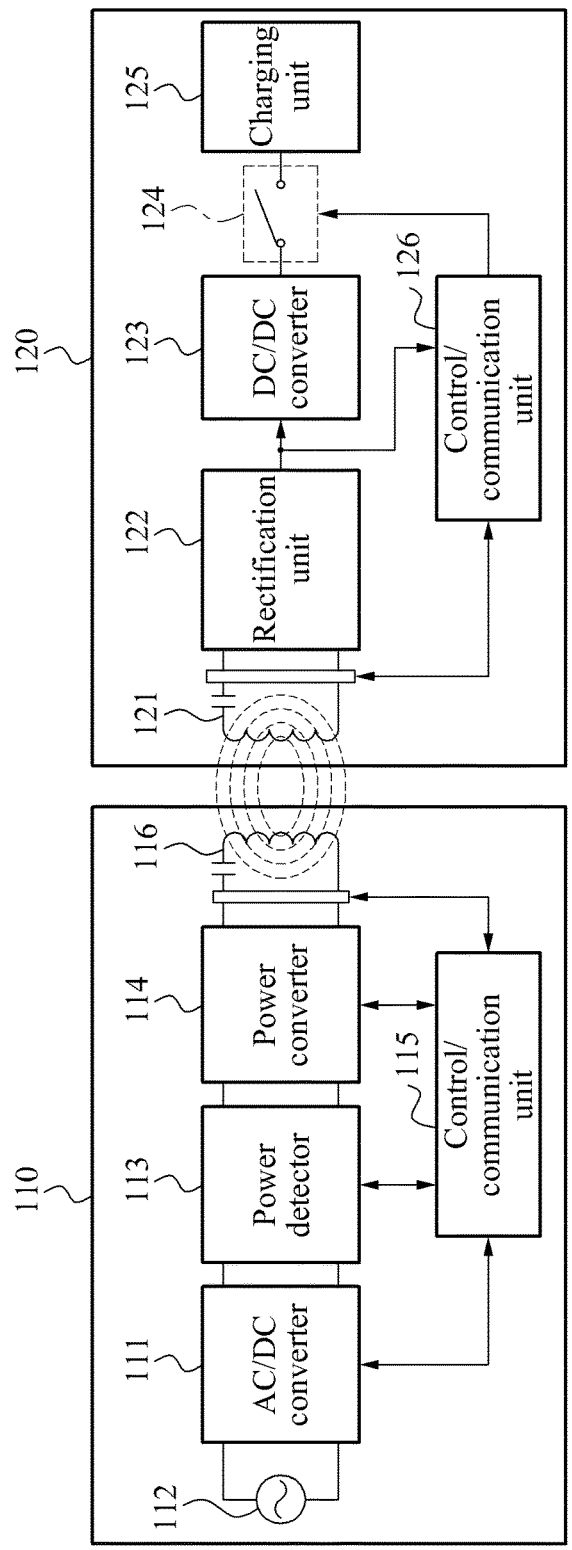
FIG. 1 illustrates an example of a wireless power transmission system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequence of processing steps and/or operations described herein are merely examples, and the sequence of processing steps and/or operations are not limited to the examples set forth herein, but may be changed as will be apparent to one of ordinary skill in the art, with the exception of processing steps and/or operations necessarily occurring in a certain order. Also, description of well-known functions and constructions may be omitted for increased clarity and conciseness.

Throughout the drawings and the detailed description, the same reference numerals refer to the same elements. The relative size and depiction of these elements may be exaggerated for clarity, illustration, and convenience.

FIG. 1 illustrates an example of a wireless power transmission system. Referring to FIG. 1, the wireless power transmission system includes a source device 110, and a target device 120.

The source device 110 includes an alternating current-to-direct current (AC/DC) converter 111, a power detector 113, a power converter 114, a control/communication unit 115, and a source resonator 116.

The target device 120 includes a target resonator 121, a rectification unit 122, a DC-to-DC (DC/DC) converter 123, a switch unit 124, a charging unit 125, and a control/communication unit 126.

The AC/DC converter 111 rectifies an AC voltage having a frequency of tens of hertz (Hz) output from a power supply 112 to generate a DC voltage. The AC/DC converter 111 may output a DC voltage having a predetermined level, or may output an adjustable DC voltage having an adjustable level controlled by the control/communication unit 115.

The power detector 113 detects an output current and an output voltage of the AC/DC converter 111, and outputs information about the detected current and the detected voltage to the control/communication unit 115. In addition, the power detector 113 detects an input current and an input voltage of the power converter 114.

The power converter 114 may use a switching pulse signal having a frequency of a few megahertz (MHz) to tens of MHz to convert a DC voltage to an AC voltage to generate a power.

For example, the power converter 114 may use a resonance frequency to convert a DC voltage to an AC voltage, and the power converter 114 may generate a communication power used for communication, or a charging power used for charging. The communication power and the charging power are used in the target device 120. The communication power is a power used to activate a communication module and a processor of the target device 120. Accordingly, the communication power may be referred to as a wake-up power. Additionally, the communication power may be transmitted as a continuous wave (CW) for a predetermined period of time. The charging power is a power used to charge a battery connected to the target device 120 or a battery included in the target device 120. The charging power may be transmitted at a higher power level than the communication power for a predetermined period of time. For example, the communication power may have a power level of 0.1 Watt (W) to 1 W, and the charging power may have a power level of 1 W to 20 W.

The control/communication unit 115 may control a frequency of a switching pulse signal. The frequency of the switching pulse signal may be determined by the control/communication unit 115. The control/communication unit 115 may control the power converter 114 to generate a modulation signal to be transmitted to the target device 120. In other words, the control/communication unit 115 may use in-band communication to transmit various messages to the target device 120. Additionally, the control/communication unit 115 may detect a reflected wave, and the control/communication unit 115 may demodulate a signal received from the target device 120 via an envelope of the detected reflected wave.

The control/communication unit 115 may use various schemes to generate a modulation signal for in-band communication. The control/communication unit 115 may turn a switching pulse signal on and off, or may perform delta-sigma modulation, to generate a modulation signal. Additionally, the control/communication unit 115 may generate a pulse-width modulation (PWM) signal having a predetermined envelope.

The control/communication unit 115 may perform out-band communication that employs a separate communication channel instead of a resonance frequency used to transmit wireless power. The control/communication unit 115 may include a communication module. The communication module may be a ZigBee module, a Bluetooth module, or any other type of communication module that is known to one of ordinary skill in the art. The control/communication unit 115 may transmit data to the target device 120 using the out-band communication and/or receive data from the target device 120 using the out-band communication.

The source resonator 116 transfers electromagnetic energy to the target resonator 121. For example, the source resonator 116 may transfer a communication power used for communication to the target device 120 or a charging power used for charging to the target device 120 using a magnetic coupling with the target resonator 121.

The target resonator 121 receives the electromagnetic energy from the source resonator 116. For example, the target resonator 121 may receive the communication power or the charging power from the source device 110 using the magnetic coupling with the source resonator 116. As another example, the target resonator 121 may use the in-band communication to receive various messages from the source device 110 using the magnetic coupling with the source resonator 116.

The rectification unit 122 rectifies an AC voltage to generate a DC voltage. In this example, the AC voltage is received from the target resonator 121.

The DC/DC converter 123 adjusts a level of the DC voltage output from the rectification unit 122 based on a voltage rating of the charging unit 125. For example, the DC/DC converter 123 may the level of the DC voltage output from the rectification unit 122 to 3 volt (V) to 10 V.

The switch unit 124 is turned on or off under the control of the control/communication unit 126. In response to the switch unit 124 being turned off, the magnetic coupling between the source resonator 116 and the target resonator 121 may be substantially reduced, causing the control/communication unit 115 of the source device 110 to detect a reflected wave.

The charging unit 125 may include a battery. The charging unit 125 may use a DC voltage output from the DC/DC converter 123 to charge the battery.

The control/communication unit 126 may use a resonance frequency to perform in-band communication for transmitting or receiving data. During the in-band communication, the control/communication unit 126 may detect a signal between the target resonator 121 and the rectification unit 122, or detect an output signal of the rectification unit 122, and demodulate a received signal from the detected signal. In other words, the control/communication unit 126 may demodulate a message received using the in-band communication.

The control/communication unit 126 may adjust an impedance of the target resonator 121 to modulate a signal to be transmitted to the source device 110. As an example, the control/communication unit 126 may turn the switch unit 124 on and off to modulate the signal to be transmitted to the source device 110. For example, the control/communication unit 126 may increase the impedance of the target resonator 121. Due to the increase of the impedance of the target resonator 121, a reflected wave may be detected by the control/communication unit 115 of the source device 110. In this example, depending on whether the reflected wave is detected, the control/communication unit 115 may detect a binary number "0" or "1."

The control/communication unit 126 may also perform out-band communication that employs a communication channel. The control/communication unit 126 may include a communication module (not illustrated) to perform the out-band communication. The communication module may be a ZigBee module, a Bluetooth module, or any other type of communication module that is known to one of ordinary skill in the art. The control/communication unit 126 may transmit data to the source device 110 using the out-band communication or receive data from the source device 110 using the out-band communication.

Figure 2:
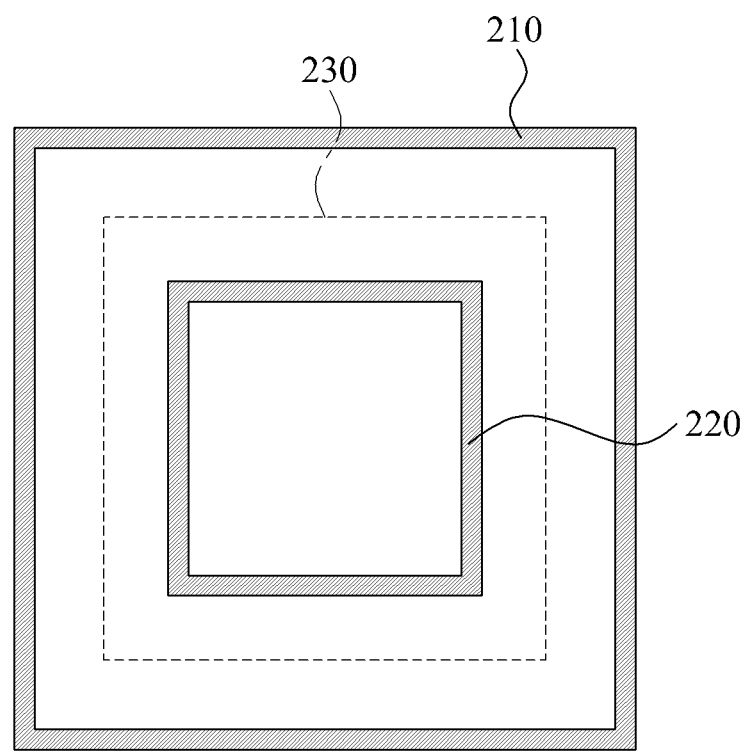
FIG. 2 illustrates an example of a wireless power transmitter.

FIG. 2 illustrates an example of a wireless power transmitter. Referring to FIG. 2, the wireless power transmitter includes a source resonator 210, a sub-resonator 220, and a magnetic field distribution controller 230.

The source resonator 210 forms a magnetic coupling with a target resonator. The source resonator 210 wirelessly transmits power to a target device through the magnetic coupling. The source resonator 210 may have a loop shape as illustrated in FIG. 2. However, the source resonator 210 may have a shape other than a loop shape, such as a spiral shape, a helical shape, or any suitable shape that is known to one of ordinary skill in the art.

Additionally, the wireless power transmitter may include a matcher (not illustrated) to be used for impedance matching. The matcher may adjust a strength of a magnetic field of the source resonator 210 to an appropriate level. An impedance of the source resonator 210 may be determined by the matcher. The matcher may have the same shape as the source resonator 210. Additionally, the matcher may have a predetermined location relative to a capacitor located in the source resonator 210 to adjust the strength of the magnetic field. For example, the matcher may be electrically connected to the source resonator 210 at both ends of the capacitor.

As an example, the matcher may be located within a loop of the loop structure of the source resonator 210. The matcher may change the physical shape of the matcher to adjust the impedance of the source resonator 210.

The sub-resonator 220 is located within the source resonator 210. A plurality of sub-resonators may be located within the source resonator 210. Additionally, a sub-sub-resonator may be located within the sub-resonator 220. The sub-resonator 220 may influence a distribution of a magnetic field formed within the source resonator 210. For example, a current flowing in the source resonator 210 may form a magnetic field, and the formed magnetic field may induce a current in the sub-resonator 220. In this example, a distribution of the magnetic field formed within the source resonator 210 may be determined based on a direction of the currents flowing in the source resonator 210 and the sub-resonator 220. As another example, the direction of the current flowing in the sub-resonator 220 may be determined based on a ratio of a resonance frequency of the sub-resonator 220 to a resonance frequency of the source resonator 210.

The resonance frequency of the source resonator 210 may be related to an inductance value L and a capacitance value C of the source resonator 210. Similarly, the resonance frequency of the sub-resonator 220 may be related to an inductance value L and a capacitance value C of the sub-resonator 220.

The magnetic field distribution controller 230 is located in a predetermined area within the source resonator 210. The magnetic field distribution controller 230 may control the direction of the current flowing in the source resonator 210 or in the sub-resonator 220. The magnetic field distribution controller 230 may control the distribution of the magnetic field formed within the source resonator 210.

The direction of the current flowing in the source resonator 210 and/or or the direction of the current flowing in the sub-resonator 220 may be related to the ratio of the resonance frequency of the sub-resonator 220 to the resonance frequency of the source resonator 210.

The magnetic field distribution controller 230 may control the resonance frequency of the source resonator 210, or the resonance frequency of the sub-resonator 220. As an example, the magnetic field distribution controller 230 may control the resonance frequency of the source resonator 210 by changing the capacitance of the source resonator 210. As another example, the magnetic field distribution controller 230 may control the resonance frequency of the sub-resonator 220 by adjusting the capacitance and the inductance of the sub-resonator 220. The magnetic field distribution controller 230 may adjust a length and a width of a line that forms the sub-resonator 220 to control the inductance value of the sub-resonator 220.

The magnetic field distribution controller 230 may control the direction of the current flowing in the source resonator 210, or the magnetic field distribution controller 230 may control the direction of the current flowing in the sub-resonator 220, so that the strength of the magnetic field formed within the source resonator 210 is increased or decreased.

The magnetic field distribution controller 230 may control the distribution of the magnetic field so that the magnetic field is uniformly distributed in the source resonator 210. As an example, the magnetic field distribution controller 230 may control the resonance frequency of the sub-resonator 220, and the magnetic field distribution controller 230 may control the magnetic field to be uniformly distributed in the source resonator 210. The configuration of the sub-resonator 220 will be further described with reference to FIG. 3.

The magnetic field distribution controller 230 may use a sub-sub-resonator to control the distribution of the magnetic field formed within the source resonator 210. The magnetic field distribution controller 230 may control a resonance frequency of the sub-sub-resonator, and the magnetic field distribution controller 230 may compensate for the uniform distribution of the magnetic field formed within the source resonator 210. The magnetic field distribution controller 230 may control the direction of the current flowing in the sub-resonator 220 and a direction of a current flowing in the sub-sub-resonator, and the magnetic field distribution controller 230 may control the distribution of the magnetic field. The sub-sub-resonator may be located in the sub-resonator 220. The sub-sub-resonator may support the sub-resonator 220, and the sub-sub-resonator may compensate for the distribution of the magnetic field formed within the source resonator 210, so that the magnetic field may be uniformly distributed. The sub-sub-resonator may compensate for the distribution of the magnetic field adjusted by the sub-resonator 220 so that the magnetic field may be uniformly distributed in the source resonator 210.

The magnetic field distribution controller 230 may include at least one coil. The at least one coil may be used to induce the magnetic field formed within the source resonator 210 towards the center of the source resonator 210. As another example, the magnetic field distribution controller 230 may use the at least one coil to control the magnetic field formed within the source resonator 210 to be uniformly distributed.

The magnetic field distribution controller 230 may control a resonance frequency of the at least one coil so that a current may flow in the at least one coil in the same direction as the current flowing in the source resonator 210.

As an example, a plurality of coils may be located in the center of the source resonator 210, and the plurality of coils may have respective loop structures having different sizes. The magnetic field distribution controller 230 may use the plurality of coils having respective loop structures having different sizes to more precisely control the magnetic field formed within the source resonator 210.

As another example, at least one coil having the same shape as another coil may be located in a predetermined position within the source resonator 210. The at least one coil having the same shape as the other coil may be located in various areas within the source resonator 210. Under the control of the magnetic field distribution controller 230, the at least one coil having the same shape as the other coil may increase or decrease the strength of the magnetic field formed within the source resonator 210 in the various areas in which the at least one coil having the same shape as the other coil is located.

As another example, the at least one coil may be located in the center of the source resonator 210. The at least one coil may be formed in a spiral shape. As another example, the at least one coil may have any suitable shape that is known to one of ordinary skill in the art, and the at least one coil may adjust the magnetic field formed within the source resonator 210.

The magnetic field distribution controller 230 may include a plurality of shielding layers. The plurality of shielding layers may have different sizes and heights located at the center of the source resonator 210, and the plurality of shielding layers may have a loop structure. Due to the plurality of shielding layers being located at the center of the source resonator 210 and having the loop structure, the magnetic field distribution controller 230 may induce the magnetic field formed within the source resonator 210 to be uniformly distributed. A magnetic flux of the magnetic field formed within the source resonator 210 may be refracted by the plurality of shielding layers, and the magnetic flux of the magnetic field may be more concentrated on the center of the source resonator 210.

The magnetic field distribution controller 230 may include a layer formed of a mu negative (MNG) material, a double negative (DNG) material, or a magneto-dielectric material. The magnetic field distribution controller 230 may refract the magnetic flux of the magnetic field formed within the source resonator 210, based on the layer, and the magnetic field distribution controller 230 may induce the magnetic field to be uniformly distributed in the source resonator 210.

The magnetic field distribution controller 230 may adjust widths of shielding layers laminated in predetermined positions of the source resonator 210 and the sub-resonator 220, and the magnetic field distribution controller 230 may induce the magnetic field to be uniformly distributed within the source resonator 210. Based on the widths of the shielding layers, a refractive level of the magnetic flux of the magnetic field formed within the source resonator 210 may be changed. Accordingly, the magnetic field distribution controller 230 may adjust the widths of the shielding layers to control the magnetic field to be uniformly distributed within the source resonator 210.

The source resonator 210 may be implemented as a pad-type resonator, and the target device may be positioned on the source resonator 210. In this example, a gap between the source resonator 210 and the target device may be less than 2 or 3 centimeters (cm). Accordingly, a parasitic capacitance may be formed between the source resonator 210 and the target device. The parasitic capacitance may influence the resonance frequency of the source resonator 210. The magnetic field distribution controller 230 may adjust widths and thicknesses of the shielding layers laminated in predetermined positions of the source resonator 210 and the sub-resonator 220 to offset a change in the resonance frequency of the source resonator 210 due to the parasitic capacitance formed between the source resonator 210 and the target device.

Figure 3:
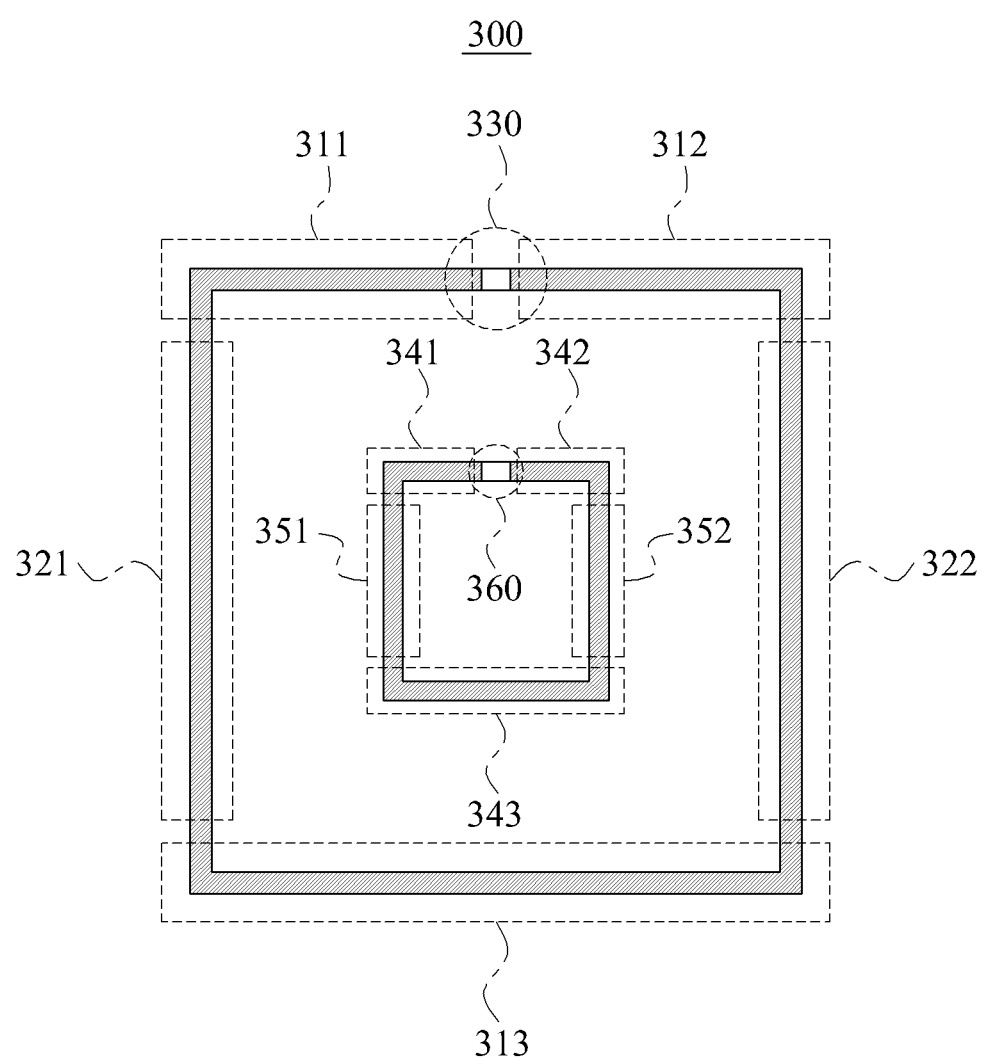
FIG. 3 illustrates an example of a wireless power transmitter.

FIG. 3 illustrates an example of a wireless power transmitter 300. A source resonator forms a magnetic coupling with a target resonator. The source resonator wirelessly transmits a power to the target device via the magnetic coupling. As illustrated in FIG. 3, the source resonator includes a first transmission line (not identified by a reference numeral in FIG. 3, but formed by various elements in FIG. 3 as discussed below), a first conductor 321, a second conductor 322, and a first capacitor 330. Although one first capacitor 330 is illustrated in FIG. 3, a plurality of first capacitors 330 may be provided.

The first capacitor 330 is inserted in series between a first signal conducting portion 311 and a second signal conducting portion 312 in the first transmission line. An electric field is confined within the first capacitor 330. The first transmission line may include at least one conductor in an upper portion of the first transmission line, and at least one conductor in a lower portion of the first transmission line. Current may flow through the at least one conductor disposed in the upper portion of the first transmission line. The at least one conductor disposed in the lower portion of the first transmission line may be electrically grounded. For example, in the example in FIG. 3, a conductor disposed in an upper portion of the first transmission line is separated into the first signal conducting portion 311 and the second signal conducting portion 312. A first ground conducting portion 313 is a conductor disposed in a lower portion of the first transmission line.

The source resonator of FIG. 3 has a two-dimensional (2D) structure. The first transmission line includes the first signal conducting portion 311 and the second signal conducting portion 312. The first signal conducting portion 311 and the second signal conducting portion 312 are located in the upper portion of the first transmission line. In addition, the first transmission line includes the first ground conducting portion 313 in the lower portion of the first transmission line. The first signal conducting portion 311 and the second signal conducting portion 312 face the first ground conducting portion 313. Current flows through the first signal conducting portion 311 and the second signal conducting portion 312.

One end of the first signal conducting portion 311 is connected to one end of the first conductor 321, the other end of the first signal conducting portion 311 is connected to one end of the first capacitor 330, and the other end of the first conductor 321 is connected to one end of the first ground conducting portion 313. One end of the second signal conducting portion 312 is connected to one end of the second conductor 322, the other end of the second signal conducting portion 312 is connected to the other end of the first capacitor 330, and the other end of the second conductor 322 is connected to the other end of the first ground conducting portion 313. Accordingly, the first signal conducting portion 311, the second signal conducting portion 312, the first ground conducting portion 313, the first conductor 321, and the second conductor 322 are connected to each other to form an electrically closed loop structure. Thus, the source resonator of FIG. 3 has an electrically closed-loop structure. The term "loop structure" includes a polygonal structure, a circular structure, a rectangular structure, and any other geometrical structure that is closed, i.e., that does not have any opening in its perimeter. The expression "having a loop structure" indicates a structure that is electrically closed, i.e., a structure that forms a closed electrical circuit.

The first capacitor 330 is inserted into an intermediate portion of the first transmission line. In the example in FIG. 3, the first capacitor 330 is inserted into a space between the first signal conducting portion 311 and the second signal conducting portion 312. The first capacitor 330 may be a lumped element capacitor, a distributed element capacitor, or any other type of capacitor known to one of ordinary skill in the art. For example, a distributed element capacitor may include a zigzagged conductor line and a dielectric material having a high permittivity disposed between parallel portions of the zigzagged conductor line.

The first capacitor 330 inserted into the first transmission line in the space between the first signal conducting portion 311 and the second signal conducting portion 312 may cause the source resonator may have a characteristic of a metamaterial. A metamaterial is a material having a predetermined electrical property that is not found in nature, and thus may have an artificially designed structure. All materials existing in nature have a magnetic permeability or a permittivity. Most materials have a positive magnetic permeability and/or a positive permittivity.

For most materials, a right-hand rule may be applied to an electric field, a magnetic field, and a Poynting vector of the materials, so the materials may be referred to as right-handed materials (RHMs). However, a metamaterial has a magnetic permeability and/or a permittivity that is not found in nature, and may be classified into an epsilon negative (ENG) material, a mu negative (MNG) material, a double negative (DNG) material, a negative refractive index (NRI) material, a left-handed (LH) material, and the other metamaterial classifications known to one of ordinary skill in the art based on a sign of the magnetic permeability and/or permittivity of the metamaterial.

If the first capacitor 330 is a lumped element capacitor and a capacitance of the first capacitor 330 is appropriately determined, the source resonator may have a characteristic of a metamaterial. If source resonator is caused to have a negative magnetic permeability by appropriate adjusting the capacitance of the first capacitor 330, the source resonator may also be referred to as an MNG resonator. Various criteria may be used to determine the capacitance of the first capacitor 330. For example, the various criteria may include a criterion for enabling the source resonator to have a characteristic of a metamaterial, a criterion for enabling the source resonator to have a negative magnetic permeability at a target frequency, a criterion for enabling the source resonator to have a zeroth order resonance characteristic at a target frequency, and any other suitable criterion. Based on any one or any combination of the aforementioned criteria, the capacitance of the first capacitor 330 may be appropriately determined.

The source resonator, also referred to as the MNG resonator, may have a zeroth order resonance characteristic of having a resonance frequency when a propagation constant is "0". If the MNG resonator has the zeroth order resonance characteristic, the resonance frequency of the MNG resonator is independent of a physical size of the MNG resonator. By changing the capacitance of the first capacitor 330, the resonance frequency of the MNG resonator may be changed without changing the physical size of the MNG resonator.

In a near field, the electric field is concentrated in the first capacitor 330 inserted into the first transmission line, causing the magnetic field to become dominant in the near field. The MNG resonator has a relatively high Q-factor when the first capacitor 330 is a lumped capacitor, thereby increasing a power transmission efficiency. The Q-factor indicates a level of an ohmic loss or a ratio of a reactance with respect to a resistance in the wireless power transmission. As will be understood by one of ordinary skill in the art, the efficiency of the wireless power transmission will increase as the Q-factor increases.

Although not illustrated in FIG. 3, a magnetic core passing through the MNG resonator may be provided to increase a power transmission distance.

Referring to FIG. 3, a sub-resonator includes a second transmission line (not identified by a reference numeral in FIG. 3, but formed by various elements in FIG. 3 as discussed below), a third conductor 351, a fourth conductor 352, and a second capacitor 360. Although one second capacitor 360 is illustrated in FIG. 3, a plurality of second capacitors 360 may be provided.

The second capacitor 360 is inserted between a third signal conducting portion 341 and a fourth signal conducting portion 342 in the second transmission line, and an electric field is confined in the second capacitor 360. In the example in FIG. 3, the second capacitor 360 is connected in series between the third signal conducting portion 341 and the fourth signal conducting portion 342.

As illustrated in FIG. 3, the sub-resonator has a 2D structure. The second transmission line includes the third signal conducting portion 341 and the fourth signal conducting portion 342 in an upper portion of the second transmission line, and a second ground conducting portion 343 in a lower portion of the second transmission line. The third signal conducting portion 341 and the fourth signal conducting portion 342 face the second ground conducting portion 343. Current flows through the third signal conducting portion 341 and the fourth signal conducting portion 342.

One end of the third signal conducting portion 341 is connected to one end of the third conductor 351, the other end of the third signal conducting portion 341 is connected to one end of the second capacitor 360, and the other end of the third conductor 351 is connected to one end of the second ground conducting portion 343. One end of the fourth signal conducting portion 342 is connected to one end of the fourth conductor 352, the other end of the fourth signal conducting portion 342 is connected to the other end of the second capacitor 360, and the other end of the fourth conductor 352 is connected to the other end of the second ground conducting portion 343. Accordingly, the third signal conducting portion 341, the fourth signal conducting portion 342, the second ground conducting portion 343, the third conductor 351, and the fourth conductor 352 are connected to each other to form an electrically closed loop structure. Thus, the sub-resonator of FIG. 3 has an electrically closed loop structure. The term "loop structure" includes a polygonal structure, a circular structure, a rectangular structure, a crossed loop structure, and any other geometrical structure that is closed, i.e., that does not have any opening in its perimeter. The expression "having a loop structure" indicates a structure that is electrically closed, i.e., a structure that forms a closed electrical circuit.

A magnetic field distribution controller (not illustrated in FIG. 3, but illustrated in FIG. 2 and described above in connection with FIG. 3) may adjust a resonance frequency of the sub-resonator based on a value of the second capacitor 360, and a length and a width of the second transmission line formed by the third signal conducting portion 341, the fourth signal conducting portion 342, and the second ground conducting portion 343. Thus, the resonance frequency of the sub-resonator may be adjusted to differ from a resonance frequency of the source resonator by a predetermined value.

The magnetic field distribution controller may adjust the value of the second capacitor 360 to adjust the resonance frequency of the sub-resonator. Accordingly, the magnetic field distribution controller may adjust the value of the second capacitor 360 to adjust the resonance frequency of the sub-resonator to be greater than or less than the resonance frequency of the source resonator so that a magnetic field formed in the center of the source resonator may have substantially the same strength as a magnetic field formed outside the source resonator.

FIGS. 4 through 8 illustrate examples of resonators. A source resonator included in a wireless power transmitter may have a structure as illustrated in FIGS. 4 through 8.

Figure 4:
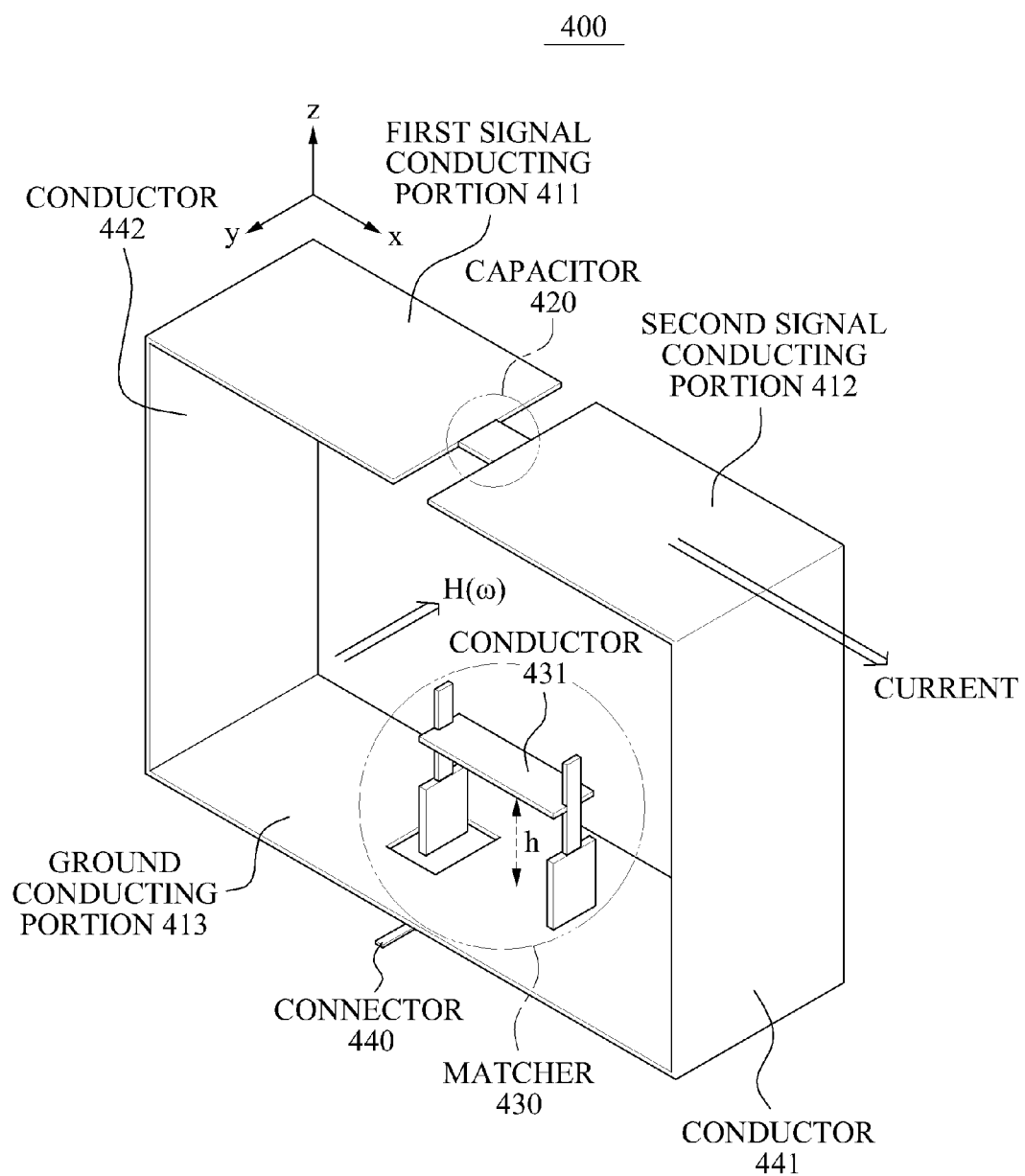
FIGS. 4 through 8 illustrate examples of resonators.

FIG. 4 illustrates an example of a resonator 400 having a three-dimensional (3D) structure. Referring to FIG. 4, the resonator 400 having the 3D structure includes a transmission line (not identified by a reference numeral in FIG. 4, but formed by various elements in FIG. 4 as discussed below) and a capacitor 420. The transmission line includes a first signal conducting portion 411, a second signal conducting portion 412, and a ground conducting portion 413. The capacitor 420 is connected in series between the first signal conducting portion 411 and the second signal conducting portion 412 of the transmission line. An electric field is confined within the capacitor 420.

As illustrated in FIG. 4, the resonator 400 has a 3D structure. The transmission line includes the first signal conducting portion 411 and the second signal conducting portion 412 in an upper portion of the resonator 400, and the ground conducting portion 413 in a lower portion of the resonator 400. The first signal conducting portion 411 and the second signal conducting portion 412 face the ground conducting portion 413. In the example in FIG. 4, current flows in an x direction through the first signal conducting portion 411 and the second signal conducting portion 412, thereby creating a magnetic field H(ω) in a −y direction. As another example, a current may flow in a −x direction through the first signal conducting portion 411 and the second signal conducting portion 412, thereby creating a magnetic field H(ω) in a +y direction.

One end of the first signal conducting portion 411 is connected to one end of a conductor 442, the other end of the first signal conducting portion 411 is connected to one end of the capacitor 420, and the other end of the conductor 442 is connected to one end of the ground conducting portion 413. One end of the second signal conducting portion 412 is connected to one end of a conductor 441, the other end of the second signal conducting portion 412 is connected to the other end of the capacitor 420, and the other end of the conductor 441 is connected to the other end of the ground conducting portion 413. Accordingly, the first signal conducting portion 411, the second signal conducting portion 412, the ground conducting portion 413, and the conductors 441 and 442 are connected to each other to form an electrically closed loop structure. Thus, the resonator 400 of FIG. 4 has an electrically closed loop structure. The term "loop structure" includes a polygonal structure, a circular structure, a rectangular structure, and any other geometrical structure that is closed, i.e., that does not have any opening in its perimeter. The expression "having a loop structure" indicates a structure that is electrically closed, i.e., a structure that forms a closed electrical circuit.

As shown in FIG. 4, the capacitor 420 is inserted between the first signal conducting portion 411 and the second signal conducting portion 412. The capacitor 420 may a lumped element capacitor, a distributed element capacitor, or any other type of capacitor known to one of ordinary skill in the art. For example, a distributed element capacitor may include a zigzagged conductor line and a dielectric material having a relatively high permittivity disposed between parallel portions of the zigzagged conductor line.

The resonator 400 with the capacitor 420 inserted into the transmission line may have a characteristic of a metamaterial. If the capacitor 420 is a lumped element capacitor and a capacitance of the capacitor 420 is appropriately determined, the resonator 400 may have a characteristic of a metamaterial. If the capacitance of the capacitor 420 is adjusted cause the resonator 400 to have a negative magnetic permeability, the resonator 400 may also be referred to as an MNG resonator. Various criteria may be used to determine the capacitance of the capacitor 420. For example, the various criteria may include a criterion for enabling the resonator 400 to have a characteristic of a metamaterial, a criterion for enabling the resonator 400 to have a negative magnetic permeability at a target frequency, a criterion for enabling the resonator 400 to have a zeroth order resonance characteristic at a target frequency, and any other suitable criterion. The capacitance of the capacitor 420 may be appropriately determined based on any one or any combination of the aforementioned criteria.

The resonator 400, also referred to as the MNG resonator 400, may have a zeroth order resonance characteristic of having a resonance frequency when a propagation constant is "0". If the MNG resonator 400 has the zeroth order resonance characteristic, the resonance frequency of the MNG resonator 400 is independent of a physical size of the MNG resonator 400. By changing the capacitance of the capacitor 420, the resonance frequency of the MNG resonator 400 may be changed without changing the physical size of the MNG resonator 400.

In the MNG resonator 400 of FIG. 4, in a near field, the electric field is concentrated in the capacitor 420 inserted into the transmission line, causing the magnetic field to become dominant in the near field due to the electric field being concentrated in the capacitor 420. The MNG resonator 400 having the zeroth order resonance characteristic has a characteristic similar to a magnetic dipole, so the magnetic field is dominant in the near field. A relatively small electric field is produced by the insertion of the capacitor 420, and that small electric is concentrated in the capacitor 420, so the magnetic field becomes even more dominant in the near field. The MNG resonator 400 has a relatively high Q-factor when the capacitor 420 is a lumped element, which increases a power transmission efficiency.

The MNG resonator 400 includes a matcher 430 for performing impedance matching. The matcher 430 adjusts the strength of magnetic field of the MNG resonator 400, and determines an impedance of the MNG resonator 400. Current flows into and/or out of the MNG resonator 400 via a connector 440 connected to the ground conducting portion 413 or the matcher 430.

For example, as shown in FIG. 4, the matcher 430 is positioned within the loop structure of the resonator 400. The physical shape of the matcher 430 is changed to adjust the impedance of the resonator 400. The matcher 430 includes a conductor 431 for performing impedance matching spaced apart from the ground conducting portion 413 by a distance h. Adjusting the distance h changes the impedance of the resonator 400.

Although not illustrated in FIG. 4, a controller may be provided to control the matcher 430. For example, the physical shape of the matcher 430 may be changed based on a control signal generated by the controller. For example, the distance h between the conductor 431 of the matcher 430 and the ground conducting portion 413 may be increased or decreased in response to the control signal. Accordingly, the physical shape of the matcher 430 may be changed to adjust the impedance of the resonator 400. The distance h between the conductor 431 of the matcher 430 and the ground conducting portion 413 may be adjusted using a variety of methods. As one example, the matcher 430 may include a plurality of conductors located at difference distances h from the ground conducting portion 413, and the distance h may be adjusted by adaptively activating one of the conductors located at a desired distance h from the ground conducting portion 413. As another example, the distance h may be adjusted by moving the physical location of the conductor 431 up and down. The distance h may be controlled based on the control signal of the controller. The controller may generate the control signal using various factors.

In the example in FIG. 4, the matcher 430 includes a passive element, i.e., the conductor 431. However, in another example, the matcher 430 may include an active element. The active element may be a diode, a transistor, or any other suitable active element known to one of ordinary skill in the art. If an active element is included in the matcher 430, the active element may be controlled based on the control signal generated by the to adjust the impedance of the resonator 400 based on the control signal. For example, a diode may be included in the matcher 430 as an active element, and the impedance of the resonator 400 may be adjusted by turning the diode ON and OFF.

Although not illustrated in FIG. 4, a magnetic core passing through MNG resonator 400 to increase a power transmission distance.

Figure 5:
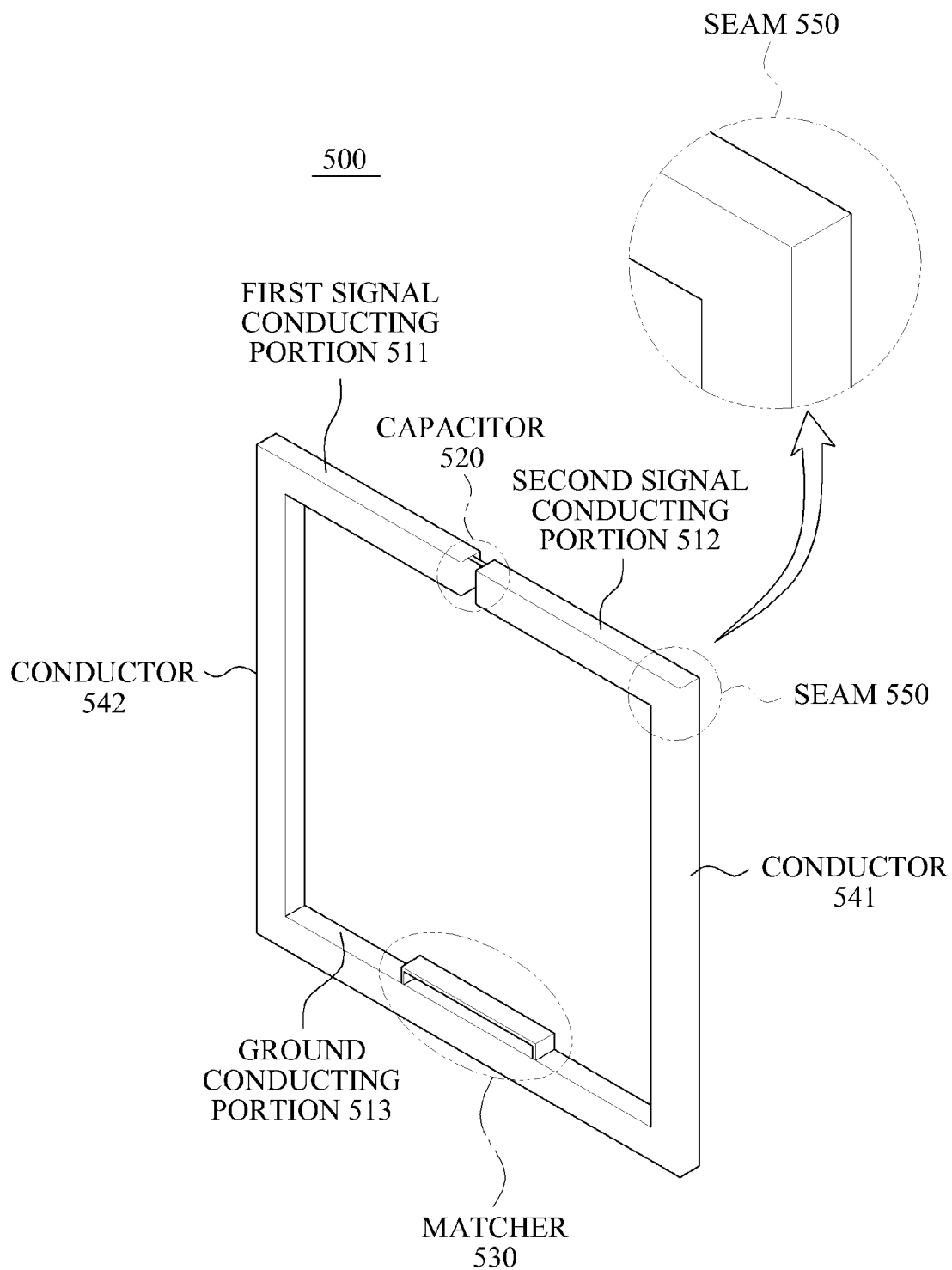

FIG. 5 illustrates an example of a bulk-type resonator 500 for wireless power transmission. A bulk-type resonator is a resonator in which at least two current-carrying elements are seamlessly connected to each other by being integrally formed as a single unit. Referring to FIG. 5, a first signal conducting portion 511, a conductor 542, a ground conducting portion 513, a conductor 541, and a second signal conducting portion 512 are integrally formed as a single unit instead of being separately manufactured and then connected to each other.

If, for example, the second signal conducting portion 512 and the conductor 541 were separately manufactured and then connected to each other, a loss of conduction might occur at a seam 550. To avoid such a loss of conduction in the bulk-type resonator 500, the first signal conducting portion 511, the conductor 542, the ground conducting portion 513, the conductor 541, and the second signal conducting portion 512 are connected to each other without using separate seams. In other words, the first signal conducting portion 511, the conductor 542, the ground conducting portion 513, the conductor 541, and the second signal conducting portion 512 are seamlessly connected to each other by integrally forming these elements as a single unit. Accordingly, a conduction loss caused by seams that would otherwise be required to connect these elements together, such as the seam 550 discussed above, is eliminated. Although in this example, the first signal conducting portion 511, the conductor 542, the ground conducting portion 513, the conductor 541, and the second signal conducting portion 512 are integrally formed as a single unit, only some of these elements may be integrally formed as a single unit.

Figure 6:
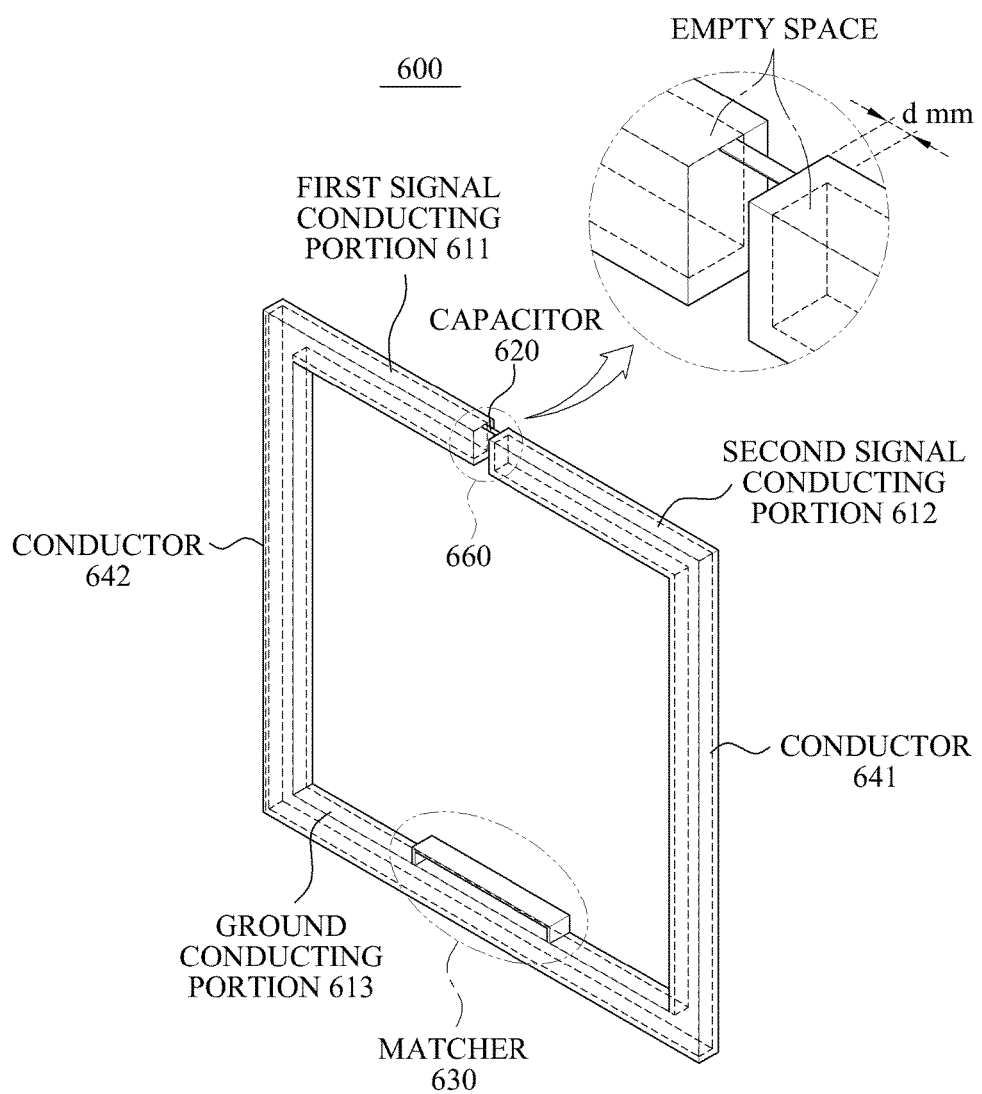

FIG. 6 illustrates an example of a hollow-type resonator 600 for wireless power transmission. Referring to FIG. 6, a first signal conducting portion 611, a second signal conducting portion 612, a ground conducting portion 613, and conductors 641 and 642 each are hollow, i.e., they each have an empty space inside. A capacitor 620 is inserted in series between the first signal conducting portion 611 and the second signal conducting portion 612, and a matcher 630 for impedance matching is provided on the ground conducting portion 613.

At a given resonance frequency, an alternating current (AC) may be modeled as flowing in only a portion of the first signal conducting portion 611, the second signal conducting portion 612, the ground conducting portion 613, and the conductors 641 and 642 between the outer surface of these elements and a level called the skin depth. If a depth of each of the first signal conducting portion 611, the second signal conducting portion 612, the ground conducting portion 613, and the conductors 641 and 642 is significantly deeper than a corresponding skin depth at the given resonance frequency, the portions of these elements deeper than the skin depth will be ineffective since substantially no current will flow in these portions. The ineffective portions increase a weight and manufacturing costs of the resonator 600.

Accordingly, at the given resonance frequency, the depth of each of the first signal conducting portion 611, the second signal conducting portion 612, the ground conducting portion 613, and the conductors 641 and 642 is determined based on the corresponding skin depth of each of the first signal conducting portion 611, the second signal conducting portion 612, the ground conducting portion 613, and the conductors 641 and so that ineffective portions deeper than the corresponding skin depth are eliminated, causing the resonator 600 to become lighter in weight, and causing the manufacturing costs of the resonator 600 to decrease.

For example, as shown in FIG. 6, a depth of the second signal conducting portion 612 may d mm, and d may be calculated according to the following Equation 1:

$$d = \frac{1}{\sqrt{\pi f \mu \sigma}} \quad (1)$$

In Equation 1, f denotes a resonance frequency, µ denotes a magnetic permeability of a material of which the first signal conducting portion 611, the second signal conducting portion 612, the ground conducting portion 613, and the conductors 641 and 642 are made, and σ denotes an electrical conductivity of the material of which the first signal conducting portion 611, the second signal conducting portion 612, the ground conducting portion 613, and the conductors 641 and 642 are made.

For example, if the first signal conducting portion 611, the second signal conducting portion 612, the ground conducting portion 613, and the conductors 641 and 642 are made of copper, which has a magnetic permeability µ of $1.257 \times 10^{-6}$ henries per meter (H·m$^{-1}$) and an electrical conductivity σ of $5.8 \times 10^7$ siemens per meter (S·m$^{-1}$), the skin depth d calculated from Equation 1 is about 0.6 mm at a resonance frequency f of 10 kHz, or about 0.006 mm at a resonance frequency f of 100 MHz.

Figure 7:
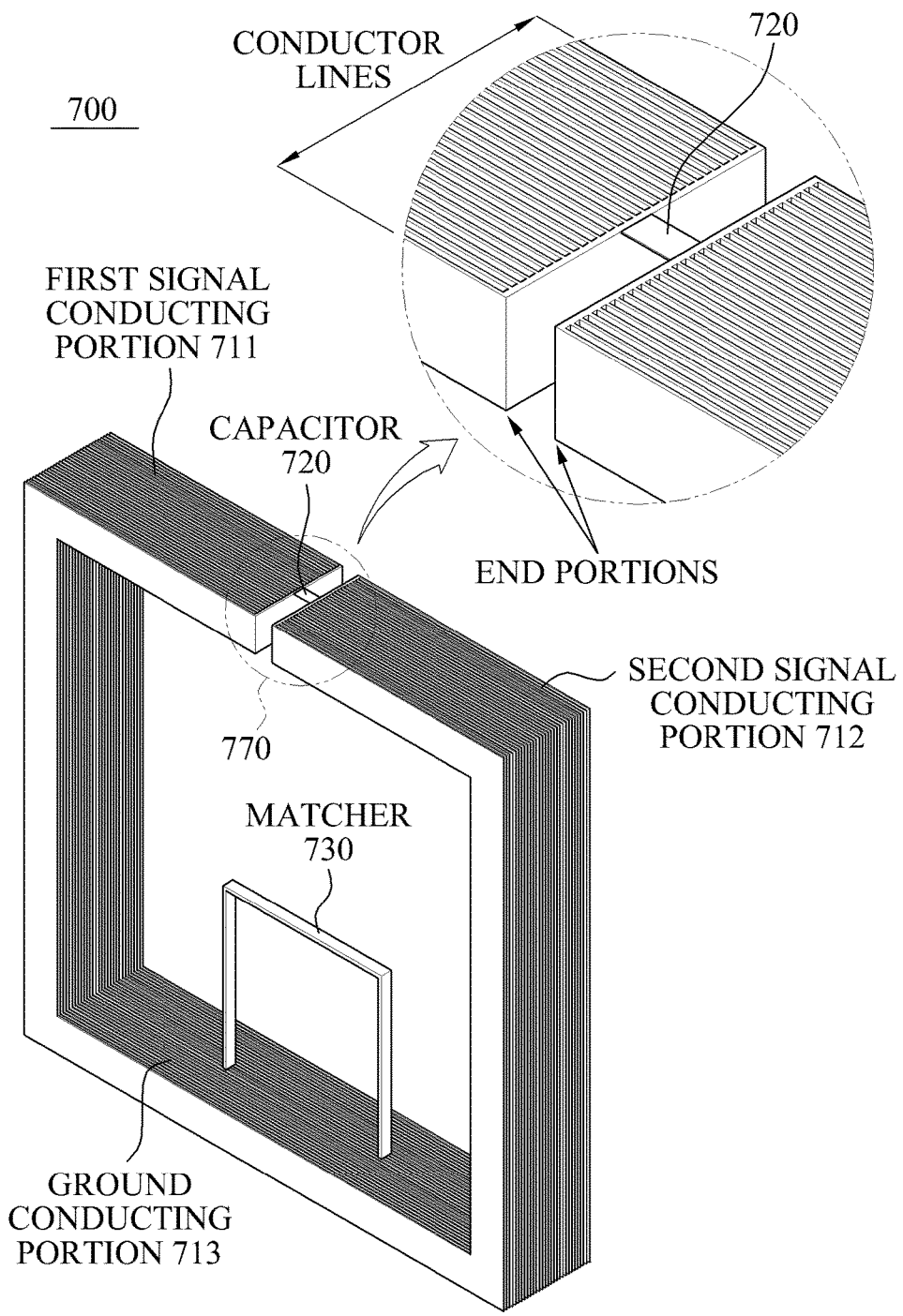

FIG. 7 illustrates an example of a resonator 700 for wireless power transmission configured as a parallel-sheet type resonator. Referring to FIG. 7, a first signal conducting portion 711, a second signal conducting portion 712, a ground conducting portion 713, and conductors 741 and 742 included in the resonator 700 are each configured as a plurality of parallel sheets. A capacitor 720 is inserted in series between the first signal conducting portion 711 and the second signal conducting portion 712, and a matcher 730 for impedance matching is provided on the ground conducting portion 713.

The first signal conducting portion 711, the second signal conducting portion 712, the ground conducting portion 713, and the conductors 741 and 742 are typically made of a material that is not a perfect conductor, and therefore have a resistance. Due to the resistance, an ohmic loss occurs in the resonator 700, which decrease a Q-factor and a coupling effect.

By configuring each of the first signal conducting portion 711, the second signal conducting portion 712, the ground conducting portion 713, and the conductors 741 and 742 as a plurality of parallel sheets, the ohmic loss maybe decreased, thereby increasing the Q-factor and the coupling effect.

Referring to a portion 770 indicated by a circle, each of the first signal conducting portion 711, the second signal conducting portion 712, the ground conducting portion 713, and the conductors 741 and 742 include a plurality of conductor lines configured as a plurality of sheets disposed parallel to each other and shorted together at an end portion of each of the first signal conducting portion 711 and the second signal conducting portion 712. This causes resistances of the conductor lines to be connected in parallel, causing a total resistance of the conductor lines to be less than a resistance of each of the conductor lines, thereby decreasing the ohmic loss, thereby increasing the Q-factor and the coupling effect.

Figure 8:
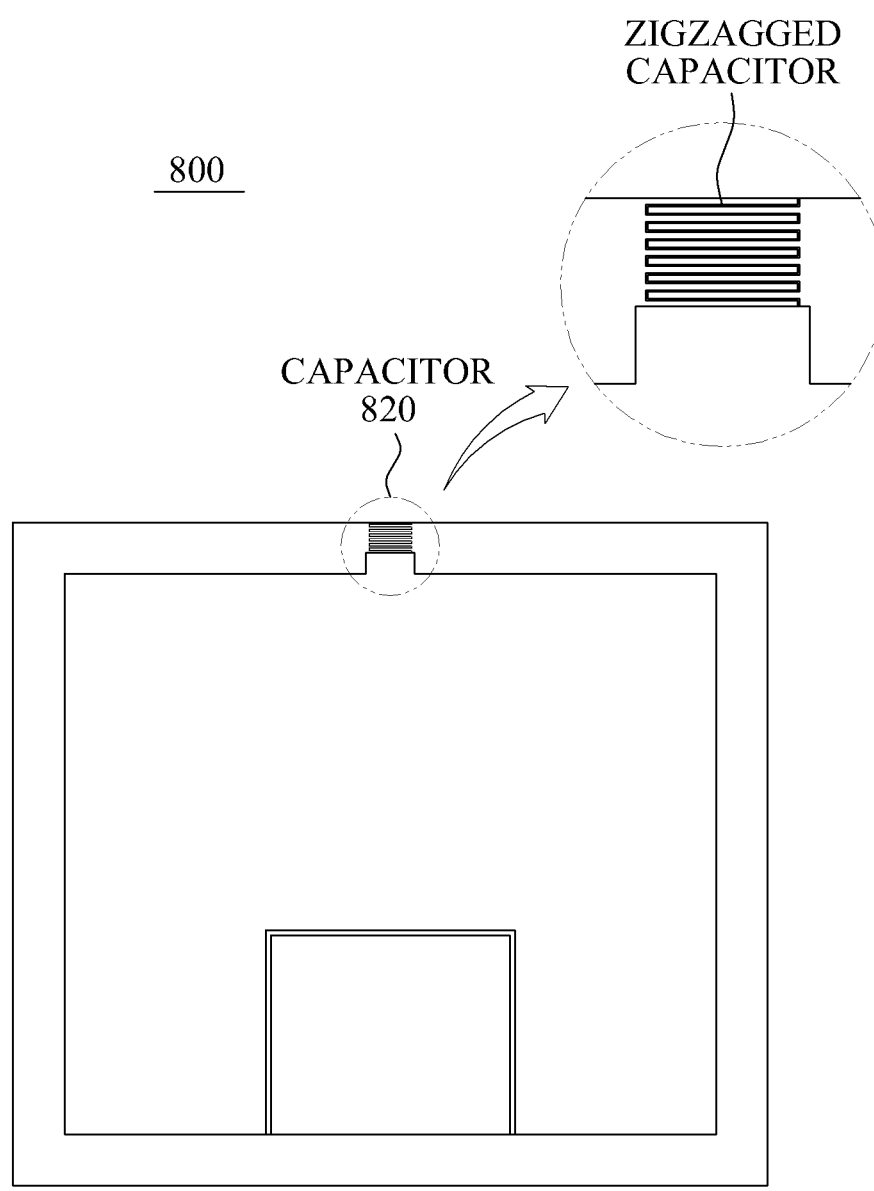

FIG. 8 illustrates an example of a resonator 800 for wireless power transmission that includes a distributed element capacitor. Referring to FIG. 8, a distributed element capacitor 820 is included in the resonator 800 for wireless power transmission. A lumped element capacitor has a relatively high equivalent series resistance (ESR). The ESR causes an ohmic loss that decreases a Q factor and a coupling effect. A variety of techniques may be used to decrease the ESR of a capacitor. In this example, by using the distributed element capacitor 820 instead of a lumped element capacitor, the ESR is decreased, thereby decreasing the ohmic loss caused by the ESR and increasing a Q-factor and a coupling effect.

In the example in FIG. 8, the distributed element capacitor 820 has a zigzagged structure configured as a zigzagged conductor line and a dielectric material having a high permittivity disposed between parallel portions of the zigzagged conductor line.

Employing the distributed element capacitor 820 having the zigzagged structure decreases an ohmic loss caused by the ESR of the distributed element capacitor 820. The distributed element capacitor 820 having the zigzagged structure may be modeled as a plurality of lumped element capacitors connected in parallel. Since a total resistance of a plurality of resistances connected in parallel is less than each of the resistances, the total ESR of a plurality of lumped element capacitors connected in parallel is less than an ESR of each of the lumped element capacitors. For example, by employing ten 1 pF capacitors each connected in parallel instead of employing a single 10 pF capacitor, it is possible to decrease the ohmic loss caused by the ESR because the total ESR of the ten 1 pF capacitors connected in parallel is one-tenth the ESR of the single 10 pF capacitor.

Figure 9:
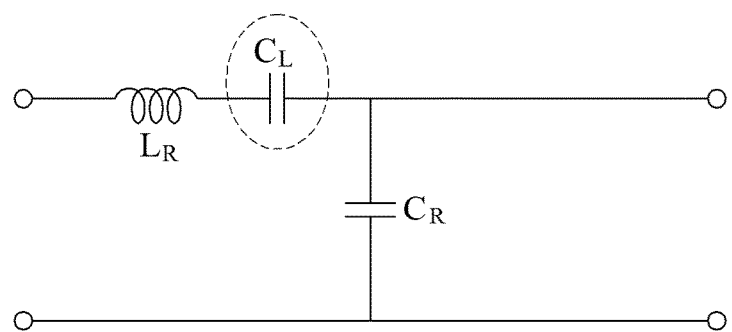
FIG. 9 illustrates an example of an equivalent circuit of a resonator of FIG. 3.

FIG. 9 illustrates an example of an equivalent circuit of the resonator of FIG. 3. The resonator of FIG. 3 may be modeled as the equivalent circuit of FIG. 9. In the equivalent circuit of FIG. 9, $L_R$ denotes an inductance of the resonator, $C_R$ denotes a capacitance of the resonator, and $C_L$ denotes a lumped element capacitor inserted in approximately the middle of one of the transmission lines of the resonator of FIG. 3.

In this example, the resonator of FIG. 3 has a zeroth order resonance characteristic in which the resonator of FIG. 3 has a resonance frequency $\omega_{MZR}$ when a propagation constant is "0". The resonance frequency $\omega_{MZR}$ may be expressed by the following Equation 2.

$$\omega_{MZR} = \frac{1}{\sqrt{L_R C_L}} \quad (2)$$

In Equation 2, MZR denotes a mu zero resonator. The capacitance $C_R$ of the resonator is negligible compared to the capacitance $C_L$ of the lumped element capacitor, so it is omitted from Equation 2.

Referring to Equation 2, the resonance frequency $\omega_{MZR}$ of the resonator of FIG. 3 depends on $L_R C_L$. Since the resonator of FIG. 3 has a zeroth order resonance characteristic in this example, a physical size of the resonator of FIG. 3 and the resonance frequency $\omega_{MZR}$ of the resonator of FIG. 3 are independent of each other, and therefore the physical size of the resonator of FIG. 3 may be reduced without changing the resonance frequency $\omega_{MZR}$.

Figure 10:
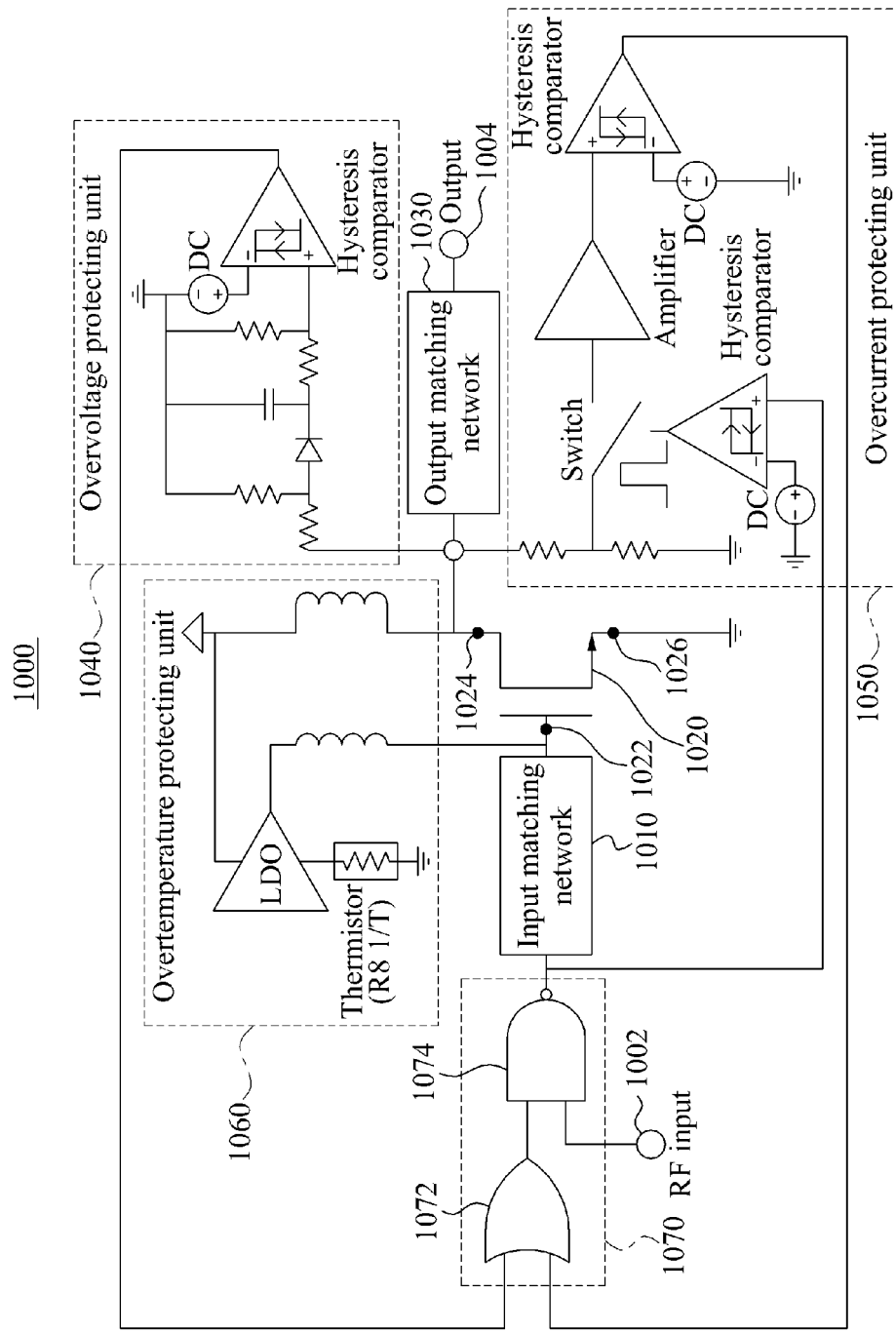
FIG. 10 illustrates an example of an apparatus including an overtemperature, overvoltage, and overcurrent protection scheme.

FIG. 10 illustrates an example of an apparatus 1000 including an overtemperature, overvoltage, and overcurrent protection scheme. The apparatus 1000 may be a radio frequency power amplifier, or a wireless power transmitter, or a portion of a wireless power transmitter.

The apparatus 1000 provides a protection scheme to prevent a breakdown from occurring as a result of an overvoltage, an overcurrent, or an overtemperature in a wireless-coupled power apparatus.

A coupling characteristic of a wireless power transmission system may change depending on (1) a distance between a wireless power transmitter and a wireless power receiver, and (2) a position of each of the wireless power transmitter and the wireless power receiver.

Generally, improper matching of impedances may occur between the wireless power transmitter and a transmitting antenna or a resonator. The improper matching of impedances may cause an increase in a magnitude of a voltage applied across a power device of the wireless power transmitter, for example, the apparatus 1000, and may result in a breakdown of the power device. Accordingly, there is a need for a circuit that can prevent a breakdown of a power device resulting from improper impedance matching resulting from a change in a coupling characteristic between devices transmitting power wirelessly.

The apparatus 1000 includes an input matching network 1010, a power device 1020, an output matching network 1030, an overvoltage protecting unit 1040, an overcurrent protecting unit 1050, an overtemperature protecting unit 1060, and a control unit 1070.

The input matching network 1010 is a circuit for performing impedance matching with a circuit, for example, a signal generator, be connected to an RF input terminal 1002 of the apparatus 1000.

The power device 1020 is a wireless power amplifier. The power device 1020 may be a bipolar junction transistor, or a Field Effect Transistor (FET), or any other type of transistor that is known to one of ordinary skill in the art. The power device 1020 includes a first terminal 1022, a second terminal 1024, and a third terminal 1026.

If the power device 1020 is an NPN bipolar junction transistor, the first terminal 1022 is a base, the second terminal 1024 is a collector, and the third terminal 1026 is an emitter.

If the power device 1020 is an N-channel FET, the first terminal 1022 is a gate, the second terminal 1024 is a drain, and the third terminal 1026 is a source.

The output matching network 1030 is a circuit for performing impedance matching with a circuit, for example, a signal generator, connected to an output terminal 1004 of the apparatus 1000.

The overvoltage protecting unit 1040 detects a voltage applied across the power device 1020, and automatically turns the apparatus 1000 OFF when an overvoltage is applied across the power device 1020. The overvoltage protecting unit 1040 automatically turns the apparatus 1000 ON and OFF using a control characteristic exhibiting hysteresis.

The overcurrent protecting unit 1050 detects a current flowing through the power device 1020, and automatically turns the apparatus 1000 OFF when an overcurrent flows through the power device 1020. The overcurrent protecting unit 1040 automatically turns the apparatus 1000 ON and OFF using a control characteristic exhibiting hysteresis.

The overtemperature protecting unit 1060 adjusts a level of a bias voltage of the power device 1020 using a thermistor to prevent a breakdown or a decrease in a performance of the power device 1020 and/or the apparatus due to a high temperature.

The control unit 1070 includes an OR gate 1072 and a NAND gate 1074.

The OR gate 1072 receives as inputs an output signal of the overvoltage protecting unit 1040, and an output signal of the overcurrent protecting unit 1050. That is, inputs of the OR gate 1072 are connected to an output of the overvoltage protecting unit 1040 and an output of the overcurrent protecting unit 1050.

The OR gate 1072 outputs a signal indicating that the apparatus 1000 is to be turned OFF when the output signal of the overvoltage protecting unit 1040 and/or the output signal of the overcurrent protecting unit 1050 is a signal indicating that the power device 1020 or the apparatus 1000 is to be turned OFF. For example, the signal indicating that the power device 1020 or the apparatus 1000 is to be turned OFF may be an overvoltage detection signal or an overcurrent detection signal, which will be hereinafter referred to as an OFF signal. Otherwise, the OR gate 1072 outputs a signal indicating that the apparatus 1000 is to be turned ON, which will be hereinafter referred to as an ON signal.

The NAND gate 1074 as inputs the output signal of the OR gate 1072 and an RF input signal. That is, inputs of the NAND gate 1074 are connected to an output of the OR gate 1072 and the RF input terminal 1002.

The NAND gate 1074 outputs an RF input signal received from the RF input terminal 1002 when the output signal of the OR gate 1072 is the ON signal, and does not output the RF input signal when the output signal of the OR gate 1072 is the OFF signal. That is, the NAND gate 1072 blocks the RF input signal from being input to the power device 1020 when the output signal of the OR gate 1072 is the OFF signal.

Connections among the elements included in the apparatus 1000 will now be described. An output of the control unit 1070 is connected to an input of the input matching network 1010. An output of the input matching network 1010 is connected to the first terminal 1022 of the power device 1020. The second terminal 1024 of the power device 1020 is connected to an input of the output matching network 1030. An output of the output matching network 1030 is connected to the output terminal 1004 of the apparatus 1000. The third terminal 1026 of the power device 1020 is connected to a ground. An input of the overvoltage protecting unit 1040 is connected to the second terminal 1024 of the power device 1020. An input of the overcurrent protecting unit 1050 is connected to the second terminal 1024 of the power device 1020. An input of the overtemperature protecting unit 1060 is connected to the second terminal 1024 of the power device 1020. An output of the overtemperature protecting unit 1060 is connected to the first terminal 1022 of the power device 1020.

Figure 11:
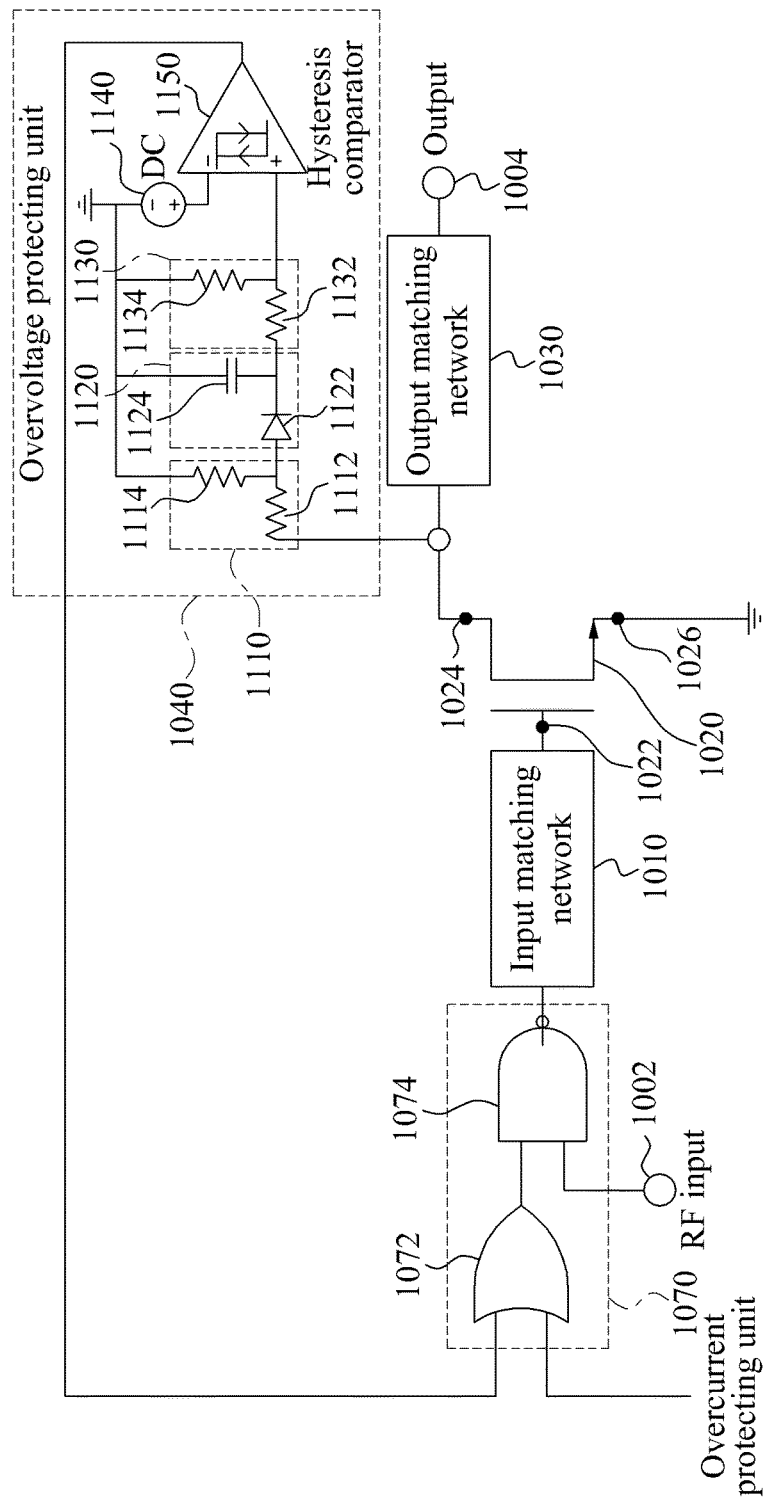
FIG. 11 illustrates an example of an overvoltage protecting unit.

FIG. 11 illustrates an example of the overvoltage protecting unit 1040 of FIG. 10. The overvoltage protecting unit 1040 includes a first resistive divider 1110, a rectifier 1120, a second resistive divider 1130, a DC supply 1140, and a comparator 1150.

The first resistive divider 1110 outputs a first divided voltage by dividing an input voltage. The input voltage is a voltage of the second terminal 1024 of the power device 1020. Generally, a voltage applied across the power device 1020 operating as a high efficiency RF power amplifier has a half-sinusoidal form. The first resistive divider 1110 has a high impedance and samples the voltage without influencing a power amplification performance of the power device. The first resistive divider 1110 includes a first resistor 1112 and a second resistor 1114. The first resistor 1112 is connected to an input of the first resistive divider 1110 and an input of the rectifier 1120. The second resistor 1114 is connected to the first resistor 1112 at the connection to the input of the rectifier 1120, and a ground.

The rectifier 1120 outputs a rectified voltage by rectifying the first divided voltage. That is, the rectifier 1120 rectifies the voltage sampled by the first resistive divider 1110. The rectifier 1120 includes a diode 1122 and a capacitor 1124. An anode of the diode 1122 is connected to the first resistive divider 1110 at the connection between the first resistor 1112 and the second resistor 1114. A cathode of the diode 1122 is connected to an input of the second resistive divider 1130. The capacitor 1124 is connected to the cathode of the diode 1122 and a ground.

The second resistive divider 1130 outputs a second divided voltage by dividing the voltage rectified by the rectifier 1120. The second resistive divider 1130 includes a third resistor 1132 and a fourth resistor 1134. The third resistor 1132 is connected to an output of the rectifier 1120, and a positive (+) terminal of the comparator 1150. The fourth resistor 1134 is connected to the third resistor 1132 at the connection to the positive (+) terminal of the comparator 1150, and a ground.

The DC supply 1140 applies a DC voltage to a negative (−) terminal of the comparator 1150. The DC supply 1140 is connected to a ground and the negative (−) terminal of the comparator 1150.

The comparator 1150 receives as inputs the second divided voltage through the + terminal, and the DC voltage through the − terminal.

A case in which a rectified voltage or a second divided voltage is greater than a reference value indicates that the apparatus 1000 needs to be protected from an overvoltage. In this case, when a difference between the rectified voltage or the second divided voltage and a reference voltage level, for example, a voltage level of a DC voltage, is small, that is, when the rectified voltage or the second divided voltage is slightly higher or lower than the reference voltage level, it may be difficult to determine whether the apparatus 1000 requires protection. Accordingly, the comparator 1150 has hysteresis.

That is, the comparator 1150 changes a control signal to be output by the comparator 1150 to a first control signal when a difference between a voltage input through the + terminal and a voltage input through the − terminal is greater than or equal to an ON-level, and changes the control signal to be output by the comparator 1150 to a second control signal when the difference between the voltage input through the + terminal and the voltage input through the − terminal is less than or equal to an OFF-level. The first control signal is an OFF signal, and the second control signal is an ON signal.

The ON-level of the comparator 1150 may be lower than a breakdown voltage of the power device 1020, for example, at least 5% lower.

The OFF-level of the comparator 1150 may be determined based on an operational frequency of the power device 1020, a power level of the power device 1020, or any other suitable criterion indicating a situation which the apparatus 1000 requires protection. When the operational frequency of the power device 1020 is relatively high, or the power level of the power device 1020 is relatively great, a difference between the ON-level and the OFF-level may need to be relatively great in order to prevent an undesired operation.

The control unit 1070 blocks the RF input signal received from the RF input terminal 1002 from being input to the power device 1020 when the control signal from the comparator 1150 is the first control signal, i.e., the OFF signal.

Accordingly, the overvoltage protecting unit 1040 protects the power device 1020 when the power device 1020 is operated at an overvoltage, such as an overvoltage caused by improper matching of wireless-coupled power devices.

Figure 12A:
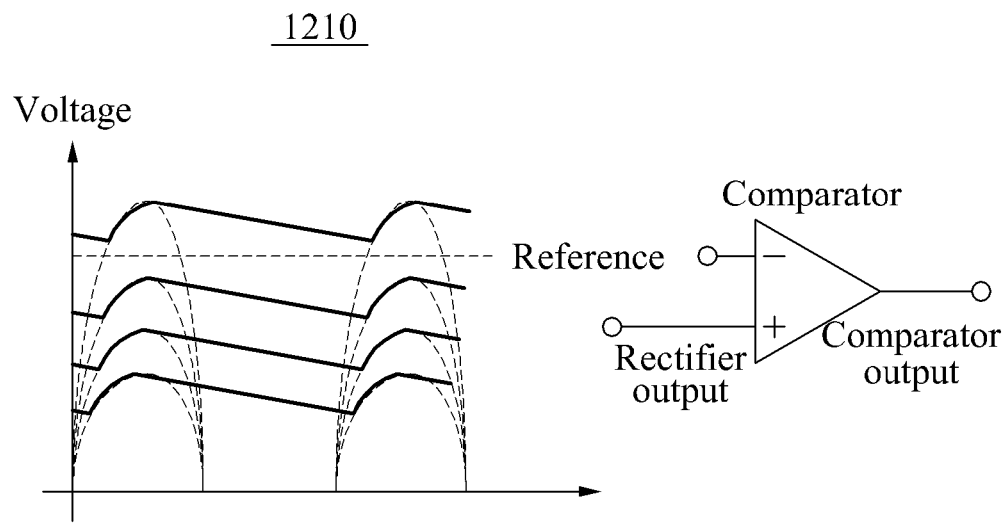
FIGS. 12A and 12B illustrate an example of an operation of a comparator having hysteresis.
Figure 12B:
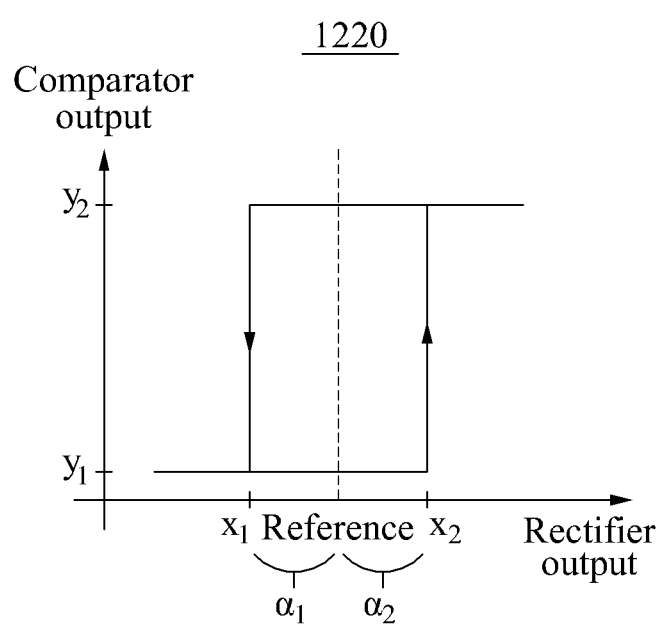

FIGS. 12A and 12B illustrate an example of an operation of the comparator 1150 of FIG. 11 having hysteresis. Solid lines in a graph 1210 of FIG. 12A indicate voltages that are rectified and output by the rectifier 1120 over time. Broken lines in the graph 1210 indicate reference voltages that are output by the DC supply 1140. A rectified voltage is input to the comparator 1150 through the + terminal. A reference voltage is input to the comparator 1150 through the − terminal. A graph 1220 of FIG. 12B indicates a voltage output from the comparator 1150 according to a voltage output from the rectifier 1120.

The comparator 1150 outputs a voltage $y_1$ when the voltage output by the rectifier 1120 is less than a voltage $x_2$. Although the voltage output by the rectifier 1120 may gradually increase, the comparator 1150 continues to output the voltage $y_1$ until the voltage output by the rectifier 1120 reaches the voltage $x_2$.

When the voltage output by the rectifier 1120 reaches the voltage $x_2$, the voltage output by the comparator 1150 changes to a voltage $y_2$. The comparator 1150 continues output the voltage $y_2$ until the voltage output by the rectifier 1120 reaches a value less than or equal to a voltage $x_1$. When the voltage output by the rectifier 1120 reaches a value less than or equal to the voltage $x_1$, the voltage output by the comparator 1150 changes to the voltage $y_1$.

That is, when a value obtained by subtracting the reference voltage output by the DC supply 1140 from the voltage output by the rectifier 1120 is greater than or equal to a value $\alpha_2$, the comparator 1150 outputs a first control signal, that is, an OFF signal, having the voltage $y_2$.

Also, when a value obtained by subtracting the voltage output by the rectifier 1120 from the reference voltage output by the DC supply 1140 is greater than or equal to a value $\alpha_1$, the comparator 1150 outputs a second control signal, that is, an ON signal, having the voltage $y_1$.

In other cases, that is, when the value obtained by subtracting the reference voltage output by the DC supply 1140 from the voltage output by the rectifier 1120 is less than the value 132, or when the value obtained by subtracting the voltage output by the rectifier 1120 from the reference voltage output by the DC supply 1140 is less than the value $\alpha_1$, the comparator 1150 continues to output a signal that is currently being output. That is, when the voltage output by the rectifier 1120 and the reference voltage output by the DC supply 1140 are within a predetermined range, the signal being output by the comparator 1150 does not change.

Figure 13:
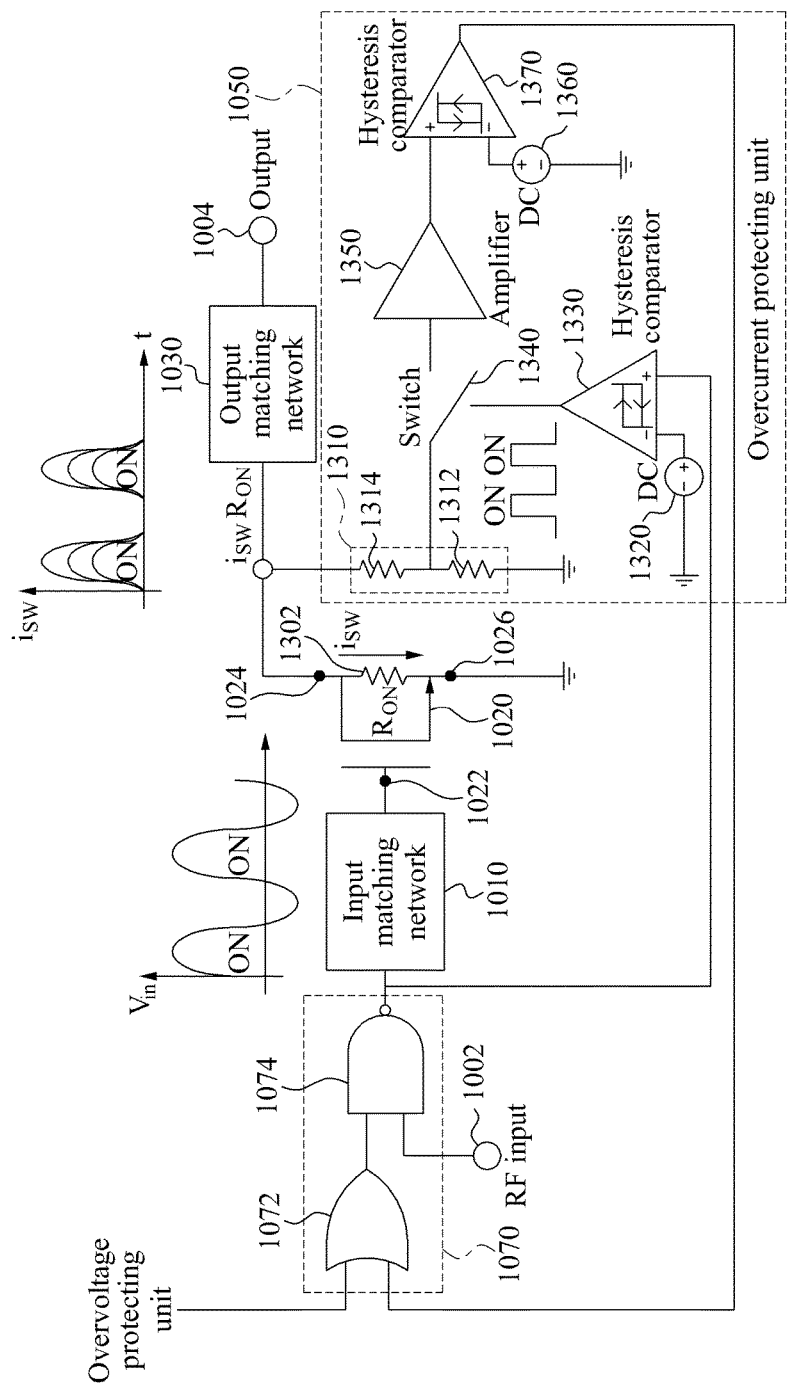
FIG. 13 illustrates an example of an overcurrent protecting unit.

FIG. 13 illustrates an example of the overcurrent protecting unit 1050 of FIG. 10. The overcurrent protecting unit 1050 includes a resistive divider 1310, a first DC supply 1320, a first comparator 1330, a switch 1340, an amplifier 1350, a second DC supply 1360, and a second comparator 1370.

Generally, the power device 1020 has an ON-resistance, which may be represented as a virtual resistor 1302 having a resistance $R_{ON}$. Accordingly, in a high-efficiency power amplifier in which the power device 1020 operates as a switch, a low voltage $i_{sw}R_{ON}$ is applied across the power device 1020 due to a current $i_{sw}$ flowing through the power device 1020, for example, between the second terminal 1024 and the third terminal 1026, when the power device 1020 is switched on.

The voltage applied across the power device 1020 is proportional to a magnitude of the current $i_{sw}$ flowing through the power device 1020. Accordingly, when an overcurrent flows through the power device 1020, a level of the voltage applied across the power device 1020 increases.

In order to detect an overcurrent, a level of a voltage applied across the power device 1020 when the apparatus 1000 or the power device 1020 is turned ON may be used. Accordingly, the switch 1340 is provided to enable the overcurrent protecting unit 1050 to sense the level of the voltage applied across the power device 1020 when the apparatus 1000 or the power device 1020 is turned ON.

The resistive divider 1310 outputs a divided voltage by dividing a first input voltage. The first input voltage is a voltage of the second terminal 1024 of the power device 1020. The resistive divider 1310 includes a first resistor 1312 and a second resistor 1314. The first resistor 1312 is connected to an input of the switch 1340 and a ground. The second resistor 1314 is connected to an input of the resistive divider 1310, which is connected to the second terminal 1024 of the power device 1020, and the first resistor 1312 at the connection to the input of the switch 1340.

The first DC supply 1320 outputs a first DC voltage to a − terminal of the first comparator 1330. The first DC supply 1320 is connected to a ground and the − terminal of the first comparator 1330.

The first comparator 1330 receives a second input voltage through a + terminal, and receives the first DC voltage output by the first DC supply 1320 through the − terminal. The first comparator 1330 has hysteresis.

That is, the first comparator 1330 outputs a switch control signal having hysteresis. The first comparator 1330 changes the switch control signal output by the first comparator 1330 to a signal to turn the switch 1340 ON when a difference between the second input voltage input through the + terminal and the first DC voltage input through the − terminal is greater than or equal to an ON level. The first comparator 1330 changes the switch control signal output by the first comparator 1330 to a signal to turn the switch 1340 OFF when the difference between the second input voltage input through the + terminal and the first DC voltage input through the − terminal is less than or equal to an OFF level, which may be less than the ON level to provide a hysteresis characteristic.

The switch control signal output by the first comparator 1330 may be a pulse signal that is synchronized with the first input signal. The switch 1340 may be controlled based on the pulse signal. The first comparator 1330 having hysteresis may adjust a pulse ON/OFF time.

The switch 1340 is connected to an output of the resistive divider 1310 and an input of the amplifier 1350. The switch 1340 is turned ON or OFF based on the switch control signal, thereby connecting or disconnecting the resistive divider 1310 and the amplifier 1350.

The amplifier 1350 outputs an amplified voltage by amplifying the divided voltage output by the resistive divider 1310.

The resistor 1302 of the power device 1020 may have an infinitesimal resistance. A voltage level of a signal output by the switch 1340 may be extremely low. Accordingly, the amplifier 1350 may be provided to amplify the signal.

The second DC supply 1360 outputs a second DC voltage to a − terminal of the second comparator 1370. The second DC supply 1360 is connected to a ground and the − terminal of the second comparator 1370.

The second comparator 1370 receives as an input, through a + terminal, the amplified voltage output by the amplifier 1350, and receives as an input, through the − terminal, the second DC voltage. The second comparator 1370 has hysteresis. The second comparator 1370 determines whether the apparatus 1000 or the power device 1020 is to be protected based on the amplified voltage output by the amplifier 1350.

That is, the second comparator 1370 outputs a control signal having hysteresis. The second comparator 1370 changes the control signal output by the second comparator 1370 to a first control signal when a difference between the amplified voltage input through the + terminal and the second DC voltage input through the − terminal is greater than or equal to an ON level. The second comparator 1370 changes the control signal output by the comparator 1370 to a second control signal when the difference between the amplified voltage input through the + terminal and the second DC voltage input through the − terminal is less than or equal to an OFF level, which may be less than the ON level to provide a hysteresis characteristic. The first control signal is an OFF signal, and the second control signal is an ON signal.

When a level of a peak current flowing through the power device 1020 increases, a level of a peak voltage of the signal amplified by the amplifier 1350 also increases. Accordingly, by setting proper hysteresis reference levels for the second comparator 1370, a level for protection from an overcurrent may be set.

The control unit 1070 the RF input signal received from the RF input terminal 1002 from being input to the power device 1020 when the control signal output by the second comparator 1370 is the first control signal, i.e., the OFF signal.

The overcurrent protecting unit 1050 protects the power device 1020 when the power device 1020 is operated at an overcurrent, such as an overcurrent caused by improper matching of wireless-coupled power devices.

The overcurrent protecting unit 1050 (1) detects a current flowing through the power device 1020 based on an input signal, inputs a divided input signal to the amplifier 1350 or blocks the divided input signal from being input to the amplifier 1350 by performing switching, (3) amplifies the divided input signal and automatically turns the apparatus 1000 ON and OFF using a control characteristic having hysteresis.

Figure 14:
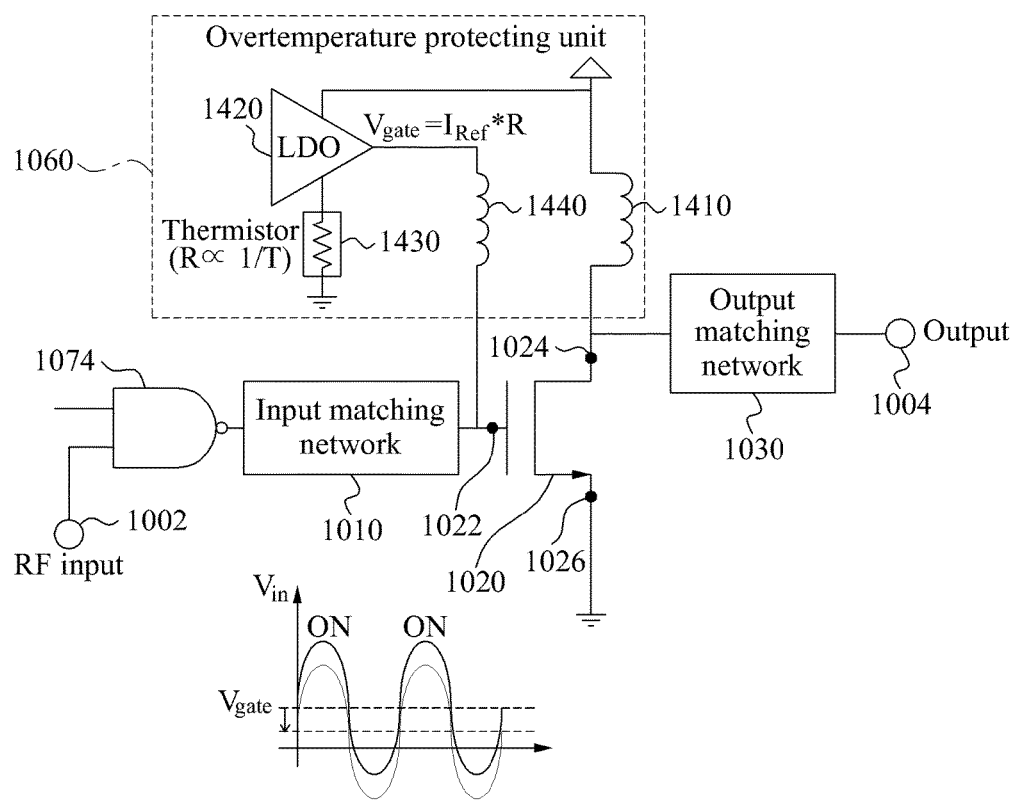
FIG. 14 illustrates an example of an overtemperature protecting unit.

FIG. 14 illustrates an example of the overtemperature protecting unit 1060 of FIG. 10. The overtemperature protecting unit 1060 includes a first inductor 1410, a regulator 1420, a thermistor 1430, and a second inductor 1440.

A bias voltage is applied to the first terminal 1022 of the power device 1020, that is, a gate or a base of the power device 1020. In this instance, the lower the bias voltage, the lower an RF power that may be input to and output from the power device 1020. Accordingly, heat generated by the power device 1020 may be reduced, so that a temperature of the apparatus 1000 or the power device 1020 may be reduced.

One end of the first inductor 1410 is connected to the second terminal 1024 of the power device 1020. The other end of the first inductor 1410 is connected to an input voltage ($V_{in}$) input of the regulator 1420. That is, the first inductor 1410 receives a signal from the second terminal 1024 of the power device 1020, and provides the received signal to the regulator 1420 as $V_{in}$.

The thermistor 1430 is connected to a ground and a reference voltage ($V_{ref}$) input of the regulator 1420.

The regulator 1420 receives $V_{in}$ from the first inductor 1410, and receives $V_{ref}$ from the thermistor 1430.

The regulator 1420 may be a low-dropout (LDO) regulator or a switching-mode regulator, such as a buck regulator, a boost regulator, or a buck-boost regulator.

The bias voltage is supplied by the regulator 1420, and depends on a resistance R of the thermistor.

A resistance of the thermistor 1430 as a temperature of the thermistor 1430 changes. Accordingly, using this characteristic of the thermistor 1430, the bias voltage may be adjusted based on the temperature. For example, If the first terminal 1022 is the gate of the power device 1020, the bias voltage may be a voltage of the gate '$V_{gate}$. the voltage of the gate may be a product of a reference current $I_{ref}$ and the resistance R.

For example, the resistance R of the thermistor 1430 decreases as a temperature T of the thermistor 1430 increases, such that R is proportional to 1/T, i.e., R∝1/T. In this example, by using the thermistor 1430 as a reference resistor of the regulator 1420, for example, the LDO regulator, a voltage output from the regulator 1420 decreases as the temperature increases. Consequently, a power output from the apparatus 1000 or the power device 1020 is reduced as the temperature increases. Accordingly, the temperature of the apparatus 1000 or the power device 1020 decreases.

One end of the second inductor 1440 is connected to an output of the regulator 1420. The other end of the second inductor 1440 is connected to the first terminal 1022 of the power device 1020. The second inductor 1440 receives the bias voltage from the output of the regulator 1420, and applies the bias voltage to the first terminal 1022 of the power device 1024.

Instead of or in addition to controlling the bias voltage of a gate or a base that is the first terminal 1022, by controlling a voltage of a drain or a collector that is the second terminal 1024 by the principle described above, an amount of power consumed by the power device 1020 may be changed, and a temperature of the power device 1020 may be controlled based on the change in the amount of power consumed by the power device 1020.

The overtemperature protecting unit 1060 protects the power device 1020 when the power device 1020 is operated at a high temperature, such as a high temperature caused by improper matching of wireless-coupled power devices.

Information detected by the overvoltage protecting unit 1040, the overcurrent protecting unit 1050, and the overtemperature protecting unit 1060 may be transferred to a main process of the apparatus 1000 or a system. The transferred information may be used for a control and communication operation of the apparatus 1000 or the system.

Figure 15:
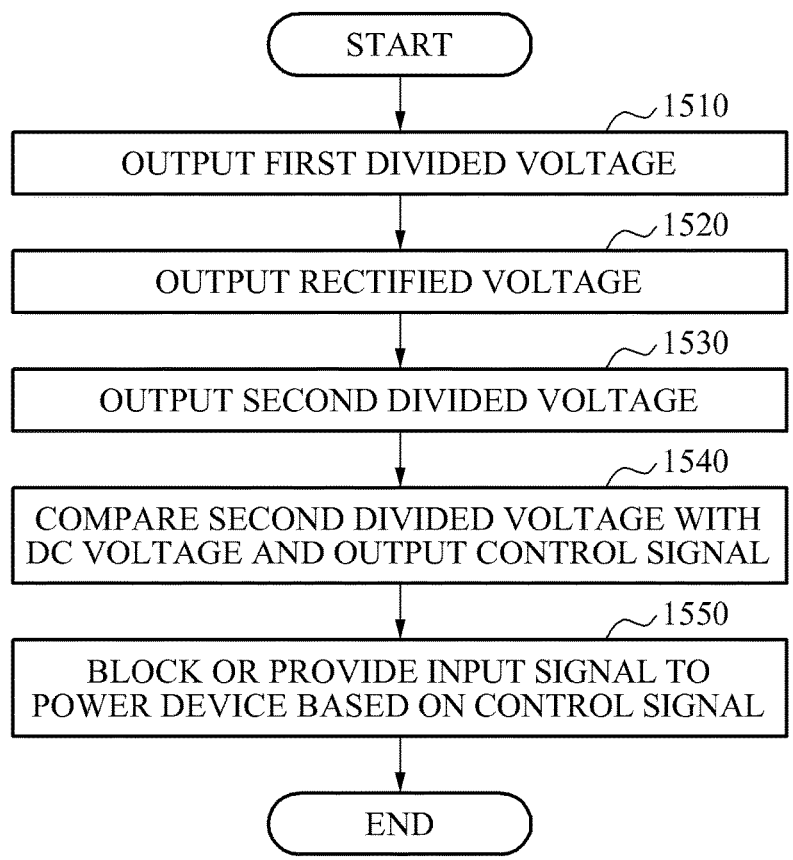
FIG. 15 illustrates an example of an overvoltage protection method.

FIG. 15 illustrates an example of an overvoltage protection method. In 1510, the first resistive divider 1110 of FIG. 11 outputs a first divided voltage by dividing an input voltage.

In 1520, the rectifier 1120 of FIG. 11 outputs a rectified voltage by rectifying the first divided voltage.

In 1530, the second resistive divider 1130 of FIG. 11 outputs a second divided voltage by dividing the rectified voltage.

In 1540, the comparator 1150 of FIG. 11 receives the second divided voltage as an input through a + terminal, and receives a DC voltage as an input through a − terminal. Also, the comparator 1150 changes a control signal output by the comparator 1150 to a first control signal when a difference between the second divided voltage input through the + terminal and the DC voltage input through the − terminal is greater than or equal to an ON level, and changes the control signal output by the comparator 1150 to a second control signal when the difference between the second divided voltage input through the + terminal and the DC voltage input through the − terminal is less than or equal to an OFF level, which may be less than the ON level to provide a hysteresis characteristic.

The first resistive divider 1110 is connected to the second terminal 1024 of the power device 1020 of FIG. 11.

In 1550, the control unit 1070 of FIG. 11 blocks a signal from being input to the power device 1020 when the control signal is the first control signal, and provides the input signal to the power device 1020 when the control signal is the second control signal.

The technical descriptions provided with reference to FIGS. 1 through 14 are also applicable to this example, and accordingly will not be repeated here for conciseness.

Figure 16:
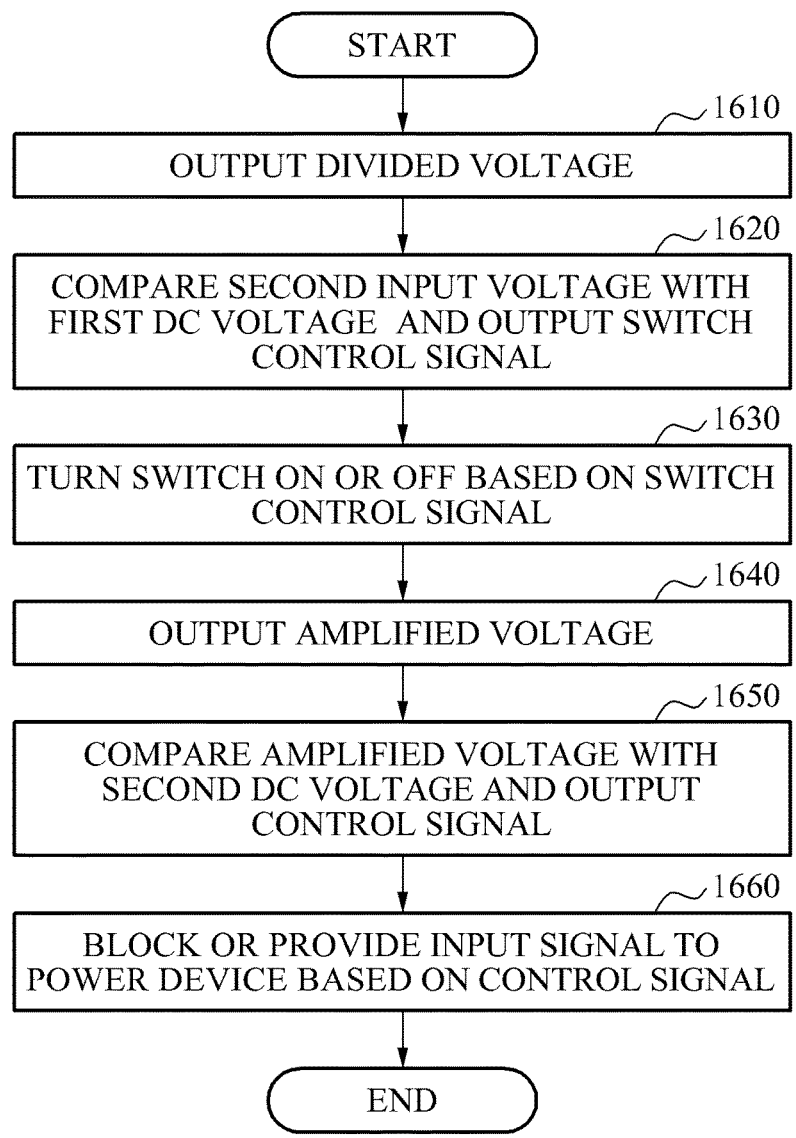
FIG. 16 illustrates an example of an overcurrent protection method.

FIG. 16 illustrates an example of an overcurrent protection method. In 1610, the resistive divider 1310 of FIG. 13 outputs a divided voltage by dividing a first input voltage.

In 1620, the first comparator 1330 of FIG. 13 outputs a switch control signal. The first comparator 1330 receives a second input voltage as an input through a + terminal, and receives a first DC voltage as an input through a − terminal.

In 1630, the switch 1340 of FIG. 13 is turned ON or OFF based on the switch control signal. When the switch 1340 is turned ON or OFF based on the switch control signal, the resistive divider 1310 and the amplifier 1350 of FIG. 13 are connected or disconnected. The first comparator 1330 changes a switch control signal to a signal to turn the switch 1340 ON when a difference between the second input voltage input through the + terminal and the first DC voltage input through the − terminal is greater than or equal to an ON level. The first comparator 1330 changes the switch control signal to a signal to turn the switch 1340 OFF when the difference between the second input voltage input through the + terminal and the first DC voltage input through the − terminal is less than or equal to an OFF level, which may be less than the ON level to provide a hysteresis characteristic.

In 1640, the amplifier 1350 outputs an amplified voltage by amplifying the divided voltage.

In 1650, the second comparator 1370 of FIG. 13 receives the amplified voltage as an input through a + terminal, and receives a second DC voltage as an input through a − terminal. The second comparator 1370 changes a control signal output by the second comparator 1370 to a first control signal when a difference between the amplified voltage input through the + terminal and the second DC voltage input through the − terminal is greater than or equal to an level, and changes the control signal output by the comparator 1370 to a second control signal when the difference between the amplified voltage input through the + terminal and the second DC voltage input through the − terminal is less than or equal to an OFF level, which may be less than the ON level to provide a hysteresis characteristic.

The resistive divider 1310 is connected to the second terminal 1024 of the power device 1020 of FIG. 11.

In 1660, the control unit 1070 of 11 blocks a signal from being input to the power device 1020 when the control signal is the first control signal, and provides the input signal to the power device 1020 when the control signal is the second control signal.

The technical descriptions provided with reference to FIGS. 1 through 15 are also applicable to this example, and accordingly will not be repeated here for conciseness.

Figure 17:
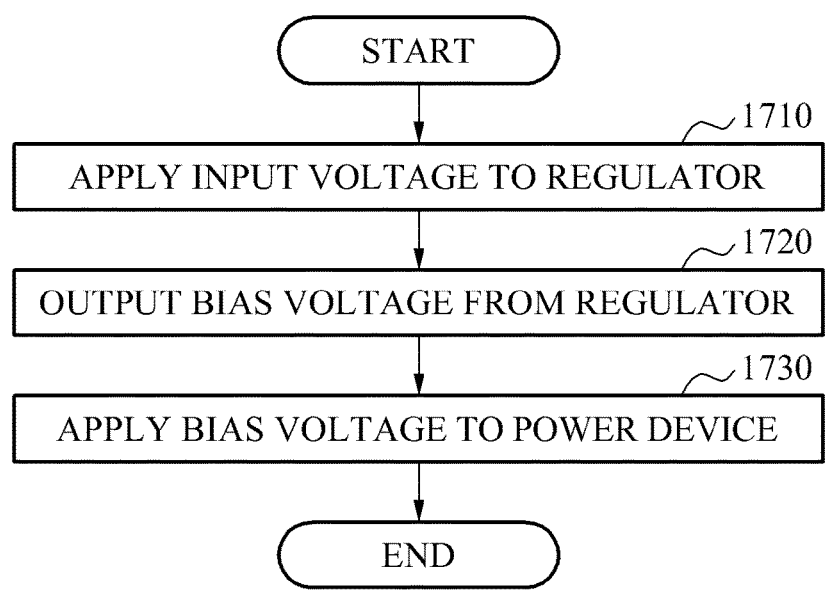
FIG. 17 illustrates an example of an overtemperature protection method.

FIG. 17 illustrates an example of an overtemperature protection method. In 1710, the first inductor 1410 of FIG. 14 applies a voltage of the second terminal 1024 of the power device 1020 of FIG. 14 to the input voltage ($V_{in}$) input of the regulator 1420 of FIG. 14. One end of the first inductor 1410 is connected to the second terminal 1024 of the power device 1020, the other end of the first inductor 1410 to the $V_{in}$ input of the regulator 1420.

The regulator 1420 may be an LDO regulator or a switching-mode regulator.

The thermistor 1430 of FIG. 14 is connected to a ground and the reference voltage ($V_{ref}$) input of the regulator 1420. A resistance of the thermistor 1430 changes as a temperature of the thermistor 1430 changes.

In 1720, the regulator 1420 outputs a bias voltage based on $V_{in}$ and $V_{ref}$.

In 1730, the second inductor 1440 of FIG. 14 applies the bias voltage output from the regulator 1420 to the first terminal 1022 of the power device 1020. One end of the second inductor 1440 is connected to an output of the regulator 1420, and the other end of the second inductor 1440 is connected to the first terminal 1022 of the power device 1020.

Figure 18:
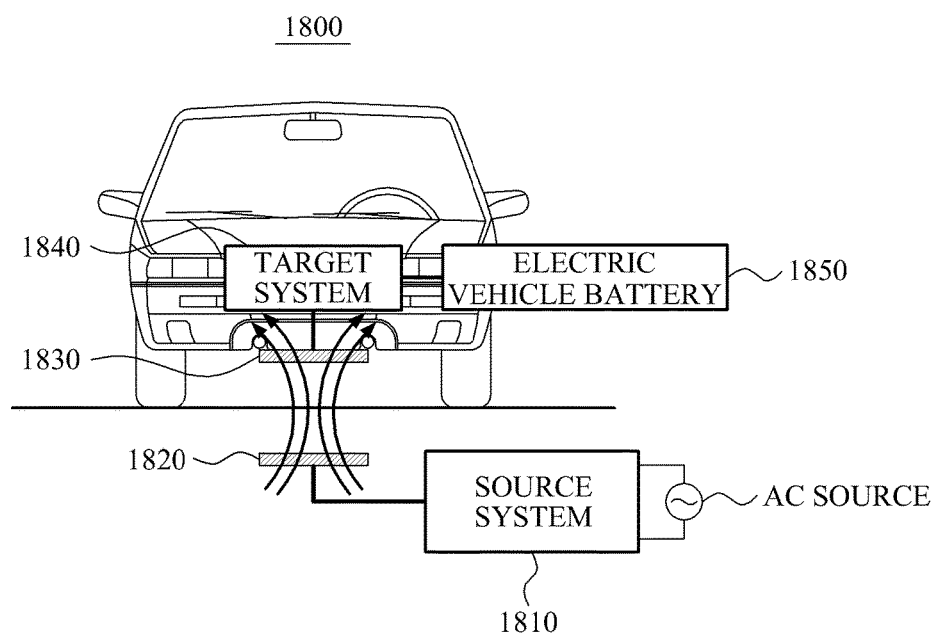
FIG. 18 illustrates an example of an electric vehicle charging system.

FIG. 18 illustrates an example of an electric vehicle charging system. Referring to FIG. 18, an electric vehicle charging system 1800 includes a source system 1810, a source resonator 1820, a target resonator 1830, a target system 1840, and an electric vehicle battery 1850.

The electric vehicle charging system 1800 has a structure similar to the wireless power transmission system of FIG. 1. The source system 1810 and the source resonator 1820 in the electric vehicle charging system 1800 operate as a source device. The target resonator 1830 and the target system 1840 in the electric vehicle charging system 1800 operate as a target device.

The source system 1810 may include an AC/DC converter, a power detector, a power converter, and a control/communication unit, similar to the source device 110 of FIG. 1. The target system 1840 may include a matching network, a rectification unit, a DC/DC converter, a switch unit, a charging unit, and a control/communication unit, similar to the target device 120 of FIG. 1.

The electric vehicle battery 1850 is charged by the target system 1840.

The electric vehicle charging system 1800 may operate at a resonance frequency in a band of a few kilohertz (kHz) to tens of MHz.

The source system 1810 may generate power equal to or higher than tens of watts based on a type of charging a vehicle, a capacity of the electric vehicle battery 1850, and a charging state of the electric vehicle battery 1805, and supply the generated power to the target system 1840 to charge the electric vehicle battery 1850.

The source system 1810 may control the source resonator 1820 and the target resonator 1830 to be aligned. For example, when the source resonator 1820 and the target resonator 1830 are not aligned, the control/communication unit of the source system 1810 may transmit a message to the target system 1840 to control alignment between the source resonator 1820 and the target resonator 1830.

For example, when the target resonator 1830 is not located in a position enabling maximum magnetic coupling, the source resonator 1820 and the target resonator 1830 will not be aligned. When a vehicle does not stop accurately at a charging station, the source system 1810 may detect a position of the vehicle, and control the source resonator 1820 and the target resonator 1830 to be aligned.

The source system 1810 and the target system 1840 may transmit or receive an ID of a vehicle and may exchange various messages by communicating with each other.

The technical descriptions of FIGS. 2 through 17 are also applicable to the electric vehicle charging system 1800, and accordingly will not be repeated here for conciseness.

The various units, elements, and methods described above may be implemented using hardware components and/or software components. Software components may be implemented by a processing device, which may be implemented using one or more general-purpose or special-purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purposes of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such a parallel processors.

As used herein, a processing device configured to implement a function A includes a processor programmed to run specific software. In addition, a processing device configured to implement a function A, a function B, and a function C may include configurations, such as, for example, a processor configured to implement functions A, B, and C; a first processor configured to implement function A and a second processor configured to implement functions B and C; a first processor configured to implement functions A and B and a second processor configured to implement function C; a first processor to implement function A, a second processor configured to implement function B, and a third processor configured to implement function C; a first processor configured to implement functions A, B, C and a second processor configured to implement functions A, B, and C, and so on.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion.

In particular, the software and data may be stored by one or more non-transitory computer-readable storage mediums. The non-transitory computer-readable storage medium may include any data storage device that can store data that can be thereafter read by a computer system or processing device. Examples of a non-transitory computer-readable storage medium include read-only memory (ROM), random-access memory (RAM), CD-ROMs, magnetic tapes, floppy disks, and optical data storage devices. Also, functional programs, codes, and code segments for implementing the examples disclosed herein can be easily constructed by programmers skilled in the art to which the examples pertain based on the drawings and their corresponding descriptions as provided herein.

While this disclosure has been particularly shown and described with reference to examples thereof, it will be understood by one of ordinary skill in the art that various changes in form and details may be made in these examples without departing from the spirit and scope of the claims and their equivalents. It should be understood that the examples described herein should be considered in a descriptive sense only, and not for purposes of limitation. Descriptions of features or aspects in each example are to be considered as being applicable to similar features or aspects in other examples. Suitable results may be achieved if the described techniques are performed in a different order and/or if components in a described system, architecture, device, or circuit are combined in a different manner and/or replaced or supplemented by other components or their equivalents. Therefore, the scope of the disclosure is defined not by the detailed description of the disclosure, but by the claims and their equivalents, and all variations within the scope of the claims and their equivalents are to be construed as being included in the disclosure.

What is claimed is:

1. An apparatus to wirelessly transmit power, the apparatus comprising:
   a power device;
   an overvoltage protecting circuit and an overcurrent protecting circuit configured to protect the power device, wherein the overvoltage protecting circuit comprises a resistive divider, a rectifier, a DC supply, and a hysteresis comparator, and the overcurrent protecting circuit comprises a resistive divider, DC supplies, a switch, an amplifier, and a hysteresis comparator; and
   a control circuit configured to perform an operation on an output signal of the overvoltage protecting circuit and an output signal of the overcurrent protecting circuit, and to determine whether an input signal is transmitted to the power device, in response to an operation result, wherein the control circuit comprises an OR gate and a NAND gate.

2. The apparatus of claim 1, further comprising
   an overtemperature protecting circuit configured to adjust a level of a bias voltage of the power device using a thermistor.

3. The apparatus of claim 1, wherein
   the OR gate is configured to perform an OR operation on the output signal of the overvoltage protecting circuit and the output signal of the overcurrent protecting circuit, and
   the NAND gate is configured to perform a NAND operation on an output signal of the OR gate and the input signal.

4. The apparatus of claim 3, wherein the control circuit is further configured to block the input signal from being input to the power device, in response to each of the output signal of the overvoltage protecting circuit and the output signal of the overcurrent protecting circuit being at a level.

5. The apparatus of claim 1, wherein the control circuit is further configured to transmit the input signal to the power device, in response to either one or both of the output signal of the overvoltage protecting circuit and the output signal of the overcurrent protecting circuit being at a level.

6. The apparatus of claim 1, wherein the control circuit is further configured to block the input signal from being input to the power device, in response to each of the output signal of the overvoltage protecting circuit and the output signal of the overcurrent protecting circuit being at a level.

7. The apparatus of claim 1, wherein the overvoltage protecting circuit is further configured to detect an overvoltage of the power device using a hysteresis comparator.

8. The apparatus of claim 1, wherein the overcurrent protecting circuit is further configured to detect an overcurrent of the power device using at least one hysteresis comparator.

9. A method of an apparatus to wirelessly transmit power, the method comprising:
   performing an operation on an output signal of an overvoltage protecting circuit and an output signal of an overcurrent protecting circuit, wherein the overvoltage protecting circuit comprises a resistive divider, a rectifier, a DC supply, and a hysteresis comparator, and the overcurrent protecting circuit comprises a resistive divider, DC supplies, a switch, an amplifier, and a hysteresis comparator; and
   determining whether an input signal is transmitted to the power device, in response to an operation result by a control circuit, wherein the control circuit comprises an OR gate and a NAND gate.

10. The method of claim 9, further comprising
    adjusting a level of a bias voltage of the power device using a thermistor.

11. The method of claim 9, wherein the performing comprises
    performing an OR operation on the output signal of the overvoltage protecting circuit and the output signal of the overcurrent protecting circuit.

12. The method of claim 11, wherein the determining comprises
    performing a NAND operation on an OR operation result and the input signal.

13. The method of claim 9, wherein the determining comprises transmitting the input signal to the power device, in response to either one or both of the output signal of the overvoltage protecting circuit and the output signal of the overcurrent protecting circuit being at a level.

14. The method of claim 9, wherein the determining comprises blocking the input signal from being input to the power device, in response to each of the output signal of the overvoltage protecting circuit and the output signal of the overcurrent protecting circuit being at a level.

* * * * *